US012634642B2

(12) United States Patent
Casper et al.

(10) Patent No.: US 12,634,642 B2
(45) Date of Patent: May 19, 2026

(54) METHOD, APPARATUS AND SYSTEM FOR NEURAL NETWORK HEARING AID

(71) Applicant: Fortell Research Inc., New York, NY (US)

(72) Inventors: Andrew J. Casper, Inver Grove Heights, MN (US); Igor Lovchinsky, New York, NY (US); Nicholas Morris, Brooklyn, NY (US); Matthew de Jonge, Brooklyn, NY (US); Jonathan Macoskey, Pittsburgh, PA (US); Philip Meyers, IV, Brooklyn, NY (US)

(73) Assignee: Fortell Research Inc., New York, NY (US)

( * ) Notice: Subject to any disclaimer, the term of this patent is extended or adjusted under 35 U.S.C. 154(b) by 0 days.

(21) Appl. No.: 19/390,398

(22) Filed: Nov. 14, 2025

(65) Prior Publication Data

US 2026/0075370 A1 Mar. 12, 2026

Related U.S. Application Data

(63) Continuation of application No. 19/278,602, filed on Jul. 23, 2025, which is a continuation of application
(Continued)

(51) Int. Cl.
*H04R 25/00* (2006.01)

(52) U.S. Cl.
CPC ........... *H04R 25/507* (2013.01); *H04R 25/43* (2013.01); *H04R 2225/43* (2013.01); *H04R 2225/61* (2013.01)

(58) Field of Classification Search
CPC ........................... H04R 25/505; H04R 25/507; H04R 2225/43; H04R 25/43; H04R 2225/41; G10L 25/78; G10L 25/783; G10L 25/786
See application file for complete search history.

(56) References Cited

U.S. PATENT DOCUMENTS 5,479,522 A 12/1995 Lindemann et al.
5,636,285 A 6/1997 Sauer
(Continued)

FOREIGN PATENT DOCUMENTS

CN 102737644 B 7/2015
CN 105611477 A 5/2016
(Continued)

OTHER PUBLICATIONS

International Search Report and Written Opinion mailed Apr. 28, 2023 in connection with International Application No. PCT/US2023/010837.
(Continued)

*Primary Examiner* — Ryan Robinson
(74) *Attorney, Agent, or Firm* — Wolf, Greenfield & Sacks, P.C.

(57) ABSTRACT

The disclosure generally relates to a method, system and apparatus to improve a user's understanding of speech in real-time conversations by processing the audio through a neural network contained in a hearing device. The hearing device may be a headphone or hearing aid. In one embodiment, the disclosure relates to an apparatus to enhance incoming audio signal. The apparatus includes a controller to receive an incoming signal and provide a controller output signal; a neural network engine (NNE) circuitry in communication with the controller, the NNE circuitry activatable by the controller, the NNE circuitry configured to generate an NNE output signal from the controller output signal; and a digital signal processing (DSP) circuitry to receive one or more of controller output signal or the NNE circuitry output signal to thereby generate a processed signal; wherein the controller determines a processing path of the controller output signal through one of the DSP or the NNE circuitries
(Continued)

as a function of one or more of predefined parameters, incoming signal characteristics and NNE circuitry feedback.

11 Claims, 13 Drawing Sheets

Related U.S. Application Data

No. 19/193,101, filed on Apr. 29, 2025, which is a continuation of application No. 18/487,401, filed on Oct. 16, 2023, now Pat. No. 12,356,153, which is a continuation of application No. 17/576,899, filed on Jan. 14, 2022, now Pat. No. 11,832,061.

(56) References Cited

U.S. PATENT DOCUMENTS

| | | | | |
|---|---|---|---|---|
| 6,104,822 | A * | 8/2000 | Melanson | H04R 25/453 381/320 |
| 7,016,507 | B1 | 3/2006 | Brennan | |
| 7,489,789 | B2 | 2/2009 | Kaulberg | |
| 7,804,973 | B2 | 9/2010 | De Vries et al. | |
| 9,716,939 | B2 | 7/2017 | Censo et al. | |
| 9,881,631 | B2 | 1/2018 | Erdogan et al. | |
| 10,199,047 | B1 | 2/2019 | Clark | |
| 10,304,475 | B1 | 5/2019 | Wang et al. | |
| 10,433,075 | B2 | 10/2019 | Crow et al. | |
| 10,516,934 | B1 | 12/2019 | Solbach | |
| 10,536,775 | B1 | 1/2020 | Sen et al. | |
| 10,659,893 | B2 | 5/2020 | Pedersen et al. | |
| 10,721,571 | B2 | 7/2020 | Crow et al. | |
| 10,805,748 | B2 | 10/2020 | Fichtl et al. | |
| 10,812,915 | B2 | 10/2020 | Santos et al. | |
| 10,957,301 | B2 | 3/2021 | Hoby et al. | |
| 11,245,993 | B2 | 2/2022 | Andersen et al. | |
| 11,270,198 | B2 | 3/2022 | Bosch et al. | |
| 11,330,378 | B1 | 5/2022 | Jelcicová et al. | |
| 11,337,011 | B2 | 5/2022 | Goorevich et al. | |
| 11,375,325 | B2 | 6/2022 | Froehlich et al. | |
| 11,445,307 | B2 | 9/2022 | Pandey et al. | |
| 11,553,286 | B2 | 1/2023 | Sabin et al. | |
| 11,620,977 | B2 | 4/2023 | Birmingham et al. | |
| 11,647,344 | B2 | 5/2023 | Chen et al. | |
| 11,678,111 | B1 | 6/2023 | Messingher Lang et al. | |
| 11,678,120 | B2 | 6/2023 | Nyayate et al. | |
| 11,696,079 | B2 | 7/2023 | Jelcicova et al. | |
| 11,711,648 | B2 | 7/2023 | Lopatka et al. | |
| 11,722,826 | B2 | 8/2023 | Goorevich et al. | |
| 11,812,225 | B2 | 11/2023 | Casper et al. | |
| 11,818,523 | B2 | 11/2023 | Lovchinsky et al. | |
| 11,818,547 | B2 | 11/2023 | Casper et al. | |
| 11,832,061 | B2 | 11/2023 | Casper et al. | |
| 11,877,125 | B2 | 1/2024 | Casper et al. | |
| 11,950,056 | B2 | 4/2024 | Casper et al. | |
| 12,075,215 | B2 | 8/2024 | Casper et al. | |
| 12,356,153 | B2 | 7/2025 | Casper et al. | |
| 12,356,154 | B2 | 7/2025 | Casper et al. | |
| 12,356,156 | B2 | 7/2025 | Casper et al. | |
| 12,363,489 | B2 | 7/2025 | Casper et al. | |
| 12,418,756 | B2 | 9/2025 | Lovchinsky et al. | |
| 2003/0033139 | A1 | 2/2003 | Walker | |
| 2003/0063759 | A1 | 4/2003 | Brennan et al. | |
| 2007/0172087 | A1 | 7/2007 | Olsen | |
| 2010/0027820 | A1 | 2/2010 | Kates | |
| 2010/0123785 | A1 | 5/2010 | Chen et al. | |
| 2012/0250885 | A1 | 10/2012 | Yoshizuka et al. | |
| 2012/0250916 | A1 | 10/2012 | Hain et al. | |
| 2013/0070935 | A1 | 3/2013 | Hui et al. | |
| 2014/0064529 | A1 | 3/2014 | Jang | |
| 2014/0219471 | A1 | 8/2014 | Deshpande et al. | |
| 2015/0078575 | A1 | 3/2015 | Selig et al. | |
| 2017/0213565 | A1 | 7/2017 | Makinen et al. | |
| 2017/0229117 | A1 | 8/2017 | Van der Made et al. | |
| 2018/0054683 | A1 | 2/2018 | Pedersen et al. | |
| 2018/0063654 | A1 | 3/2018 | Kuriger et al. | |
| 2018/0146285 | A1 | 5/2018 | Benattar et al. | |
| 2019/0149927 | A1 | 5/2019 | Zhang et al. | |
| 2019/0208317 | A1 | 7/2019 | Woodruff et al. | |
| 2019/0320260 | A1 | 10/2019 | Alders et al. | |
| 2019/0335288 | A1 | 10/2019 | Latypov et al. | |
| 2020/0043499 | A1 | 2/2020 | Basye et al. | |
| 2020/0204928 | A1 | 6/2020 | Fichtl | |
| 2020/0312343 | A1* | 10/2020 | Hsiung | G10L 25/78 |
| 2020/0322735 | A1 | 10/2020 | Mosgaard et al. | |
| 2021/0042575 | A1 | 2/2021 | Firner | |
| 2021/0076124 | A1 | 3/2021 | Hoang et al. | |
| 2021/0105565 | A1 | 4/2021 | Pedersen et al. | |
| 2021/0274296 | A1 | 9/2021 | Rohde et al. | |
| 2021/0281958 | A1 | 9/2021 | Diehl et al. | |
| 2021/0289299 | A1 | 9/2021 | Durrieu | |
| 2022/0058773 | A1 | 2/2022 | Chou et al. | |
| 2022/0095061 | A1 | 3/2022 | Diehl et al. | |
| 2022/0124444 | A1 | 4/2022 | Andersen et al. | |
| 2022/0159403 | A1 | 5/2022 | Sporer et al. | |
| 2022/0223161 | A1 | 7/2022 | Fuchs et al. | |
| 2022/0230048 | A1 | 7/2022 | Li et al. | |
| 2022/0232321 | A1 | 7/2022 | Wexler et al. | |
| 2022/0232331 | A1 | 7/2022 | Jelcicová et al. | |
| 2022/0256294 | A1 | 8/2022 | Diehl et al. | |
| 2023/0034525 | A1 | 2/2023 | Scheller | |
| 2023/0037356 | A1 | 2/2023 | Pontoppidan et al. | |
| 2023/0042310 | A1 | 2/2023 | Wexler et al. | |
| 2023/0087486 | A1 | 3/2023 | Pennies-Hochmuth et al. | |
| 2023/0164496 | A1 | 5/2023 | Serman et al. | |
| 2023/0209283 | A1 | 6/2023 | Wagner et al. | |
| 2023/0232169 | A1 | 7/2023 | Casper et al. | |
| 2023/0232170 | A1 | 7/2023 | Casper et al. | |
| 2023/0232171 | A1 | 7/2023 | Casper et al. | |
| 2023/0232172 | A1 | 7/2023 | Casper et al. | |
| 2023/0254650 | A1 | 8/2023 | Lovchinsky et al. | |
| 2023/0254651 | A1 | 8/2023 | Casper et al. | |
| 2023/0292074 | A1 | 9/2023 | Marquardt et al. | |
| 2023/0306982 | A1 | 9/2023 | Lovchinsky et al. | |
| 2023/0319492 | A1 | 10/2023 | Corey et al. | |
| 2023/0362559 | A1* | 11/2023 | Bhowmik | H04R 25/507 |
| 2023/0388725 | A1 | 11/2023 | Casper et al. | |
| 2023/0402055 | A1 | 12/2023 | Kulasekaran et al. | |
| 2024/0048922 | A1 | 2/2024 | Casper et al. | |
| 2024/0056747 | A1 | 2/2024 | Casper et al. | |
| 2024/0129674 | A1 | 4/2024 | Casper et al. | |
| 2024/0194213 | A1 | 6/2024 | Wichern et al. | |
| 2024/0205615 | A1 | 6/2024 | Jensen et al. | |
| 2024/0221769 | A1 | 7/2024 | Philipsson et al. | |
| 2024/0292165 | A1 | 8/2024 | Lovchinsky et al. | |
| 2024/0381039 | A1 | 11/2024 | Casper et al. | |
| 2024/0422484 | A1 | 12/2024 | Casper et al. | |
| 2025/0063287 | A1 | 2/2025 | Innes-Brown et al. | |
| 2025/0260932 | A1 | 8/2025 | Casper et al. | |
| 2025/0317698 | A1 | 10/2025 | Casper et al. | |
| 2025/0317699 | A1 | 10/2025 | Casper et al. | |
| 2025/0317700 | A1 | 10/2025 | Casper et al. | |
| 2025/0350891 | A1 | 11/2025 | Casper et al. | |

FOREIGN PATENT DOCUMENTS

| | | | | |
|---|---|---|---|---|
| CN | 110060666 | A * | 7/2019 | G10L 25/27 |
| CN | 110992967 | A | 4/2020 | |
| CN | 113593594 | A | 11/2021 | |
| EP | 0 357 212 | A2 | 3/1990 | |
| JP | 2012-208406 | A | 10/2012 | |
| JP | 2016-531332 | A | 10/2016 | |
| JP | 2019-090930 | A | 6/2019 | |
| JP | 2020-134887 | A | 8/2020 | |
| KR | 102316626 | B1 | 10/2021 | |
| WO | WO 2009/001559 | A1 | 12/2008 | |
| WO | WO 2012/066149 | A1 | 5/2012 | |
| WO | WO 2020/079485 | A2 | 4/2020 | |
| WO | WO 2022/079848 | A1 | 4/2022 | |
| WO | WO 2022/107393 | A1 | 5/2022 | |
| WO | WO 2022/191879 | A1 | 9/2022 | |
| WO | WO 2023/010014 | A1 | 2/2023 | |

(56) References Cited

FOREIGN PATENT DOCUMENTS

| | | | |
|---|---|---|---|
| WO | WO 2023/110836 | A1 | 6/2023 |
| WO | WO 2023/136835 | A1 | 7/2023 |

OTHER PUBLICATIONS

International Preliminary Report on Patentability mailed Jul. 25, 2024 in connection with International Application No. PCT/US2023/010837.

International Search Report and Written Opinion mailed Jun. 16, 2022 in connection with International Application No. PCT/US2022/012567.

International Preliminary Report on Patentability mailed Jul. 25, 2024 in connection with International Application No. PCT/US2022/012567.

Extended European Search Report dated Oct. 22, 2025 in connection with European Application No. EP22920907.7.

Office Action for Japanese Application No. 2024539468, mailed Sep. 9, 2025.

[No Author Listed], An introduction to MoreSound Intelligence. Tech Paper 2020. Oticon life-changing technology. 2020, 12 pages.

[No Author Listed], GAP9 next generation processor for hearables and smart sensors. Greenwaves Technologies. 2021, 2 pages.

Gerlach et al., A Survey on Application Specific Processor Architectures for Digital Hearing Aids. Journal of Signal Processing Systems. Mar. 20, 2021;94:1293-1308. https://link.springer.com/rticle/10.1007/s11265-021-01648-0 [last retrieved May 17, 2022].

Giri et al., Personalized Percepnet: Real-time, Low-complexity Target Voice Separation and Enhancement. Amazon Web Service, Jun. 8, 2021, arXiv preprint arXiv:2106.04129. 5 pages.

Markovic, et al. Implicit Neural Spatial Filtering for Multichannel Source Separation in the Waveform Domain. Meta, Reality Labs Research, Pittsburgh PA, USA, Metal AI Research, Paris, France, Jun. 30, 2022, 5 pages.

Weile et al., The Velox Platform. Tech Paper, 2016. https://assets-ue.cas.dgs.com/-/media/oticon-US/main/download-center/white-papers/15555-9940-velox-whitepaper.pdf , 8 pages.

* cited by examiner

METHOD, APPARATUS AND SYSTEM FOR NEURAL NETWORK HEARING AID

CROSS-REFERENCE TO RELATED APPLICATIONS

This application is a continuation claiming the benefit under 35 U.S.C. § 120 of U.S. patent application Ser. No. 19/278,602, filed Jul. 23, 2025, entitled "METHOD, APPARATUS AND SYSTEM FOR NEURAL NETWORK HEARING AID," which is hereby incorporated by reference herein in its entirety U.S. patent application Ser. No. 19/278,602 is a continuation claiming the benefit under 35 U.S.C. § 120 of U.S. patent application Ser. No. 19/193,101, filed Apr. 29, 2025, entitled "METHOD, APPARATUS AND SYSTEM FOR NEURAL NETWORK HEARING AID," which is hereby incorporated by reference herein in its entirety.

U.S. patent application Ser. No. 19/193,101 is a continuation claiming the benefit under 35 U.S.C. § 120 of U.S. patent application Ser. No. 18/487,401, filed Oct. 16, 2023, entitled "METHOD, APPARATUS AND SYSTEM FOR NEURAL NETWORK HEARING AID," which is hereby incorporated by reference herein in its entirety.

U.S. patent application Ser. No. 18/487,401 is a continuation claiming the benefit under 35 U.S.C. § 120 of U.S. patent application Ser. No. 17/576,899, filed Jan. 14, 2022, entitled "METHOD, APPARATUS AND SYSTEM FOR NEURAL NETWORK HEARING AID," which is hereby incorporated by reference herein in its entirety.

FIELD

The disclosure generally relates to a method, apparatus and system for neural network enabled hearing device. In some embodiments, the disclosure provides a method, system and apparatus to improve a user's understanding of speech in real-time conversations by processing the audio through a neural network contained in a hearing device like a headphone or hearing aid.

BACKGROUND

Ease of communication between people in real-world situations is often impeded by background noise. When background noise is loud relative to the speech, the speech is effectively drowned out by the background noise. Bars, restaurants and concerts are examples of commonly challenging environments for conversation. At particularly challenging "signal-to-noise" ratios, people with normal hearing will struggle, but these environments are particularly challenging for people with hearing loss.

Hearing loss or hearing impairment makes it difficult to hear, recognize and understand sound. Hearing impairment may occur at any age and can be the result of birth defect, age or other causes. The most common type of hearing loss is sensorineural. It is a permanent hearing loss that occurs when there is damage to either the tiny hair-like cells of the inner ear, known as stereocilia, or the auditory nerve itself, which prevents or weakens the transfer of nerve signals to the brain. Sensorineural hearing loss typically impairs both volume sensitivity (ability to hear quiet sounds) and frequency selectivity (ability to resolve distinct sounds in the presence of noise). This second impairment has particularly severe consequences for speech intelligibility in noisy environments. Even when speech is well above hearing thresholds, individuals with hearing loss will experience decreased ability to follow conversation in the presence of background noise relative to normal hearing individuals.

Traditional hearing aids provide amplification necessary to offset decreased volume sensitivity. This is helpful in quiet environments, but in noisy environments, amplification is of limited use because people with hearing loss will have trouble selectively attending to the sounds they want to hear. Traditional hearing aids use a variety of techniques to attempt to increase the signal-to-noise ratio for the wearer, including directional microphones, beamforming techniques, and postfiltering. But none of these methods are particularly effective as each relies on assumptions that are often incorrect, such as the position of the speaker or the statistical characteristics of the signal in different frequency ranges. The net result is that people with hearing loss still struggle to follow conversations in noisy environments, even with state-of-the-art hearing aids.

Neural networks provide the means for treating sounds differently based on the semantics of the sound. Such algorithms can be used to separate speech from background noise in real-time, but putting more powerful algorithms like neural networks in the signal path has previously been considered infeasible in a hearing aid or headphone. Hearing aids have limited battery with which to compute such algorithms, and such algorithms have struggled to perform adequately in the variety of environments encountered in the real-world. The disclosed embodiments address these and other deficiencies of the conventional hearing aids.

BRIEF DESCRIPTION OF THE DRAWINGS

The disclosed embodiments are described in relation to the following exemplary and non-limiting embodiments in which similar elements are numbered similarly, and in which.

DETAILED DESCRIPTION

Figure 1:
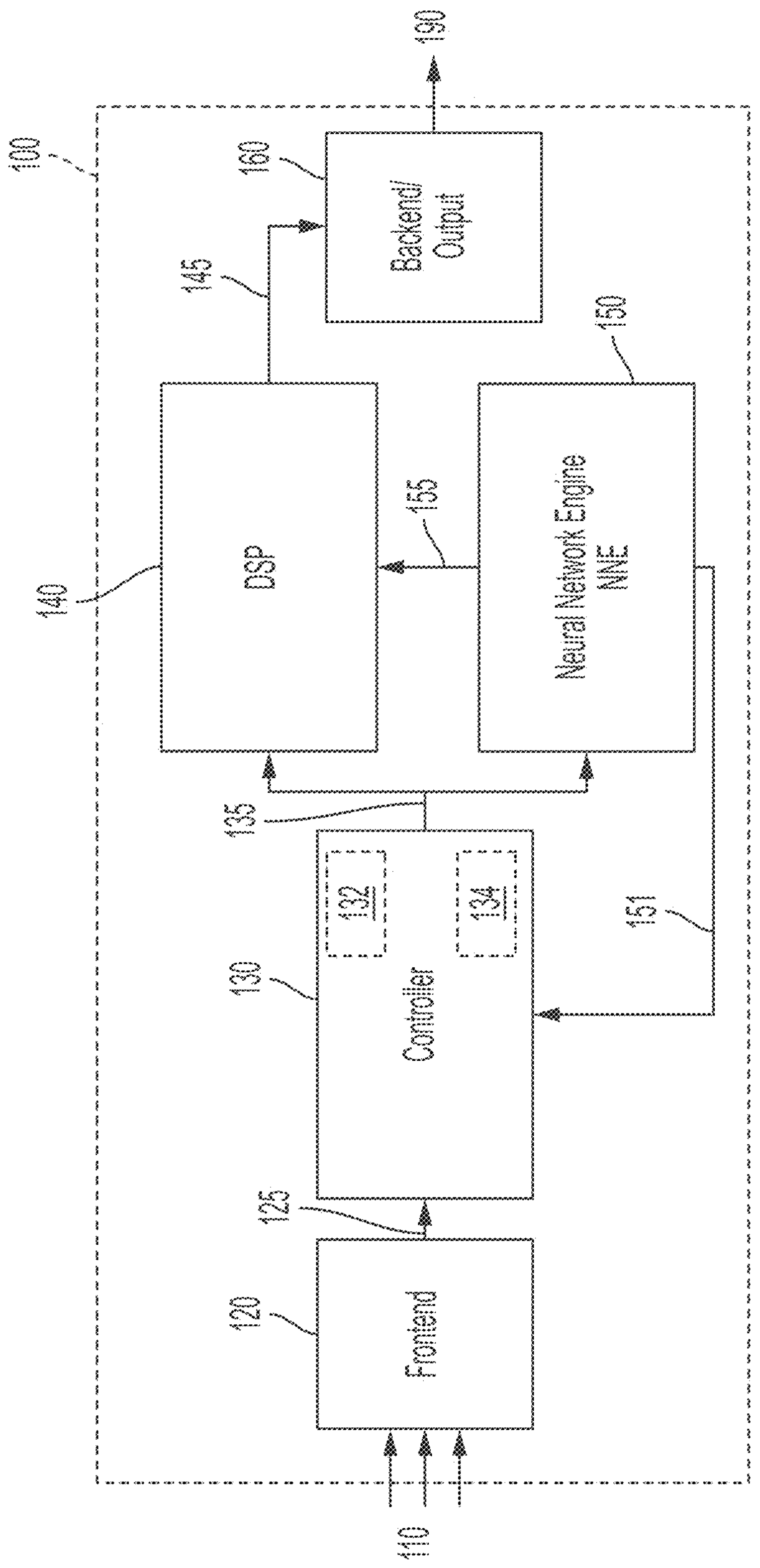
FIG. 1 is a system diagram according to one embodiment of the disclosure.

The following description and exemplary embodiments are set forth to provide a thorough understanding of various embodiments. However, various embodiments may be practiced without the specific details. In other instances, well-known methods, procedures, components, and circuits have not been described in detail so as not to obscure the particular embodiment. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

The disclosed embodiments generally relate to enhancement of audio data in an ear-worn system, such as a hearing aid or a headphone, using a neural network. Neural network-based audio enhancement has been deployed in other applications, like videoconferencing and other telecommunications mediums. In many of these applications, these algorithms are used to reduce background noise, making it easier for the user to hear a target sound, typically the speech of the person who is speaking to the user. Neural network-based audio enhancement has been considered too difficult for in-person applications where the user is in the same location as the person or thing they are trying to hear.

One primary reason in-person communication has been considered impractical is the complexity of the task facing the algorithm. Whereas over video communication, tolerable latency is relatively high (>50 milliseconds), the speaker is typically close to the microphone (creating a relatively high signal-to-noise ratio (SNR) in the signal received at the microphone) and ambient noise is usually limited to what is encountered during an in-person scenario is far less forgiving.

Human hearing is highly attuned to latency introduced by signal processing in the ear-worn device. Too much delay can create the perception of an echo as both the original sound and the amplified version played back by the earpiece reach the ear at different times. Also, delays can interfere with the brain's processing of incoming sound due to the disconnect between visual cues (like moving lips) and the arrival of the associated sound. Hearing aids are one of the primary examples of ear-worn devices for in-person communication. The optimal latency for such devices is under 10 milliseconds (ms), though longer latencies as high as 32 milliseconds are tolerable in certain circumstances.

These in-person scenarios also introduce high variability in the nature of the background noise and far lower SNR signals. Social environments such as bars, restaurants and outdoor venues often require having a conversation in the presence of overwhelming background noise. Similarly, there is far more variety in the common types of environments than in a typical conference call. Therefore, it is more difficult to create a neural network that is robust to these situations.

Neural networks offer a fundamentally different way of filtering audio than the conventional hearing aids. A primary difference is the power and flexibility in executing auditory algorithms. Traditional digital signal processing system require manually adjusting parameters of an auditory equation. Neural networks allow for the optimal parameters to be discovered through training, which is a computational process whereby the network learns to solve a task by tuning parameters to incrementally improve performance. Whereas a human may be able to optimally tune a hundred parameters, a neural network can learn millions of parameters.

Traditional digital signal processing in hearing devices typically applies a set of filters and gains (interchangeably, weights) that adjust the signal magnitude at different frequencies. In conventional hearing aids these gains compensate, among other things, for the user's lost frequency sensitivity. These algorithms typically do not typically adjust the phase of the incoming signal. Neural networks are computationally powerful to robustly generate fine-grained adjustments to both the magnitude and phase of the incoming signal at tremendous granularity in both the time and frequency domains.

A challenge associated with incorporating neural network algorithms is the computational cost. There is a well-established positive correlation between network size and network performance that is seen across different domains in deep learning. To get the fine-grained response necessary to robustly handle a variety of acoustic environments, neural networks will have thousands of parameters and require millions, if not billions, of operations per second. The size of the network that can be run is limited by the computational power of the processor in the hearing device. To be comfortable and convenient for the wearer, hearing aid devices must be compact and capable of long operating time. The hearing aid is ideally integrated in one device and not across multiple devices (e.g., hearing aid and a smart device).

These neural network algorithms are also difficult to incorporate in a manner that yields an optimal user experience. Even if a hearing aid is capable of isolating sound from a single source, that behavior may not always be desirable. For example, ambient sound may be important to a pedestrian. Some amount of ambient noise may be desirable even when speech isolation is the primary objective. For example, someone in a restaurant may find that hearing only speech is disorienting or disconcerting and may prefer to have at least a low level of ambient noise passed through to provide a sense of ambience. Thus, a desirable user experience requires the device to leverage the power of a neural network and also use its output intelligently.

Another issue with creating a good user experience is dealing with model error. Even well-trained large neural networks will not perform perfectly and in certain environments they may be incapable of distinguishing one sound source from another. In these scenarios, the device should fail gracefully in a manner that provides the user with a pleasant auditory experience. By way of example, a conversation that is interrupted by a loud vehicle may produce garbled white noise to the hearer if the model output is played back without consideration of model error. Thus, a solution is needed that monitors model output and performance and dynamically adjusts to create a suitable user experience.

As used herein, a hearing device generally refers to a hearing aid, an active ear-protection device or other audio processing device which are configurable to improve, amplify and/or protect the hearing capability of the user. A hearing aid may be implemented in one or two earpieces. Such devices typically receive acoustic signals from the user's surroundings and generate corresponding audio signals with possible modification of the audio signals to provide modified audio signals as audible signals to the user.

The modification may be implemented at one or both hearing devices corresponding to each of the user's ears. In certain embodiments, the hearing device may include an earphone (individually or as a pair), a headset or other external devices that may be adapted to provide audible acoustic signals to the user's outer ear. The delivered acoustic signals may be fine-tuned through one or more controls to optimally deliver mechanical vibration to the user's auditory system.

In one embodiment, the disclosure relates to a hearing aid capable of utilizing neural network-based audio enhancement in the signal processing chain. As used herein, a neural network in the signal processing chain comprises a system where the neural network is integrated with the in-ear hearing device. In some embodiment, the hearing device comprises, among others, a neural network integrated with the auxiliary circuits on an integrated circuit (IC). The IC may comprise a System-on-Chip (SoC).

In some implementations, an exemplary device is configured to, among others, amplify all ambient sound, filter incoming sound down to speech (removing background noise), filter incoming sound down to one or more target speakers, toggle between these modes according to user input, adjust the volume of background noise according to user's input, change what types of sounds are considered "noise", adjust the output of the hearing aid in all modes to fit the user's hearing profile (including frequency sensitivity and dynamic range).

In one embodiment, a neural network is incorporated into the hearing aid. The hearing aid may include one or more processors optimized to process the workload of the neural network. The one or more processors may be selectively engaged based on the operating mode of the device. Some embodiments of this invention address these issues by introducing a dual-path signal chain that allows for selective engagement of one or more of the neural networks and a digital signal processor. By creating a dual signal processing path, the hearing aid user enjoys the benefit of neural network-based enhancement when the neural network engagement is necessary and desirable. These and other embodiments of the disclosure are discussed in relation to the following exemplary embodiments.

FIG. 1 is a system diagram according to one embodiment of the disclosure. System 100 may be implemented in a hearing aid. In an exemplary embodiment, system 100 is implemented in one or both earpieces of a hearing device. System 100 may be implemented as an integrated circuit. System 100 may be implemented as an IC or an SoC.

System 100 receives input signals 110 and provides output signals 190. Input signals 110 may comprise acoustic signals emanating from a plurality of sources. The acoustic sources emanating acoustic signals 110 may include ambient noises, human voice(s), alarm sounds, etc. Each acoustic source may emanate sound at a different volume relative to the other sources. Thus, input signal 110 may be an amalgamation of different sounds reaching system 100 at different volumes.

Front end receiver 120 may comprise one or more modules configured to convert incoming acoustic signals 110 into a digital signal using an analog to digital converter (ADC). The frontend receiver 120 may also receive signals from one or more microphones at one or more earpieces. In certain embodiments, signals received at one earpiece are transmitted using a low-latency protocol such as near field magnetic induction to the other earpiece for use in signal processing. The output of frontend receiver 120 is a digital signal 125 representing one or more received audio streams.

It should be noted that while FIG. 1 shows an exemplary embodiment in which frontend 120 and controller 130 are separate components. In certain embodiments, one or more functions of frontend 120 may be performed at controller 130 to obviate frontend 120.

In the embodiment of FIG. 1, NNE circuitry is interposed between controller 130 and DSP 140. Thus, NNE circuitry 150 is in the direct signal processing path. This means that when said signal path is employed, audio is processed through the neural network and enhanced before that same audio is played out. This is in contrast to methods where neural networks are employed outside the direct signal chain to tune the parameters of the direct signal chain. These methods use the neural network output to enhance subsequently received audio, not the same audio processed through neural network. In certain embodiments, the NNE circuitry is configured to selectively apply a complex ratio mask to the incoming signal of the frontend receiver to obtain a plurality of components wherein each of the plurality of components corresponds to a class of sounds or an individual speaker, the NNE circuitry is further configured to combine these components into a output signal wherein the volumes of the components are set to obtain a user-controlled signal to noise ratio.

Controller 130 receives digital signal 125 from frontend receiver 120. Controller 130 may comprise one or more processor circuitries (herein, processors), memory circuitries and other electronic and software components configured to, among others, (a) perform digital signal processing manipulations necessary to prepare the signal for processing by the neural network engine 150 or the DSP engine 140, and (b) to determine the next step in the processing chain from among several options. In one embodiment of the disclosure, controller 130 executes a decision logic to determine whether to advance signal processing through one or both of DSP unit 140 and neural network engine (NNE) circuitry 150. It should be noted that frontend 120 may comprise one or more processors to convert the incoming signal while controller 130 may comprise one or more processors to execute the exemplary tasks disclosed herein; these functions may be combined and implemented at controller 130.

DSP 140 may be configured to apply a set of filters to the incoming audio components. Each filter may isolate incoming signals in a desired frequency range and apply a non-linear, time-varying gain to each filtered signal. The gain value may be set to achieve dynamic range compression or may identify stationary background noise. DSP 140 may then recombine the filtered and gained signals to provide an output signal.

As stated, in one embodiment, the controller performs digital signal processing manipulations to prepare the signal for processing by one or both of DSP 140 and NNE 150. NNE 150 and DSP 140 may accept as input the signal in the time-frequency domain (e.g., signal 110), so that controller 130 may take a Short-Time Fourier Transform (STFT) of the incoming signal before passing it onto the controller. In another example, controller 130 may perform beamforming of signals received at different microphones to enhance the audio coming from a certain direction.

In certain embodiments, controller 130 continually determines the next step in the signal chain for processing the received audio data. For example, controller 130 activates NNE 150 based on one or more of user-controlled criteria, user-agnostic criteria, user clinical criteria, accelerometer data, location information, stored data and the computed metrics characterizing the acoustic environment, such as signal-to-noise ratio (SNR). If NNE 150 is not activated, controller 130 instead passes signal 135 directly to DSP 140. In some embodiments, controller 130 may pass data to both NNE 150 and DSP 140 simultaneously as indicated by arrow 135.

User-controlled criteria (interchangeably, logic or user-defined) may comprise user inputs including the selection of an operating mode through an application on a user's smartphone or input on the device (for example by tapping the device). For example, when a user is at a restaurant, she may change the operating mode to noise cancellation/speech isolation by making an appropriate selection on her smartphone. User-controlled criteria may also comprise a set of user-defined settings and preferences which may be either input by the user through an application (app) or learned by the device over time. For example, user-controlled logic may comprise a user's preferences around what sounds the user hears (e.g., new parents may want to always amplify a baby's cry, or a dog owner may want to always amplify barking) or the user's general tolerance for background noise. User clinical criteria may comprise a clinically relevant hearing profile, including, for example, the user's general degree of hearing loss and the user's ability to comprehend speech in the presence of noise.

User-controlled logic may also be used in connection with or aside from user-agnostic criteria (or logic). User-agnostic logic may consider variables that are independent of the user. For example, the user-agnostic logic may consider the hearing aid's available power level, the time of day or the expected duration of NNE operation (as a function of the anticipated NNE execution demands).

In some embodiments, acceleration data as captured on sensors in the device may aid controller 130 in determining whether to direct signal controller output signal 135 to one or both of DSP 140 and NNE 150. Movement or acceleration information may guide controller 130 to determine whether the user is in motion or sedentary. Acceleration data may be used in conjunction with other information or may be overwritten by other data. Similarly, data from sensors capturing acceleration may be provided to the neural network as information for inference.

In other embodiments, the user's location may be used by controller 130 to determine whether to engage one or both of DSP 140 and NNE circuitry 150. Certain locations may require activation of NNE circuitry 150. For example, if the user's location indicates high ambient noise (e.g., the user is strolling through a park or is attending a concert) and no direct conversation, controller 130 may activate DSP 140 only. On the other hand, if the user's location suggests that the user is traveling (e.g., via car or train) and other indicators suggest human communication, then NNE circuitry 150 may be activated to amplify human voices over the surrounding noise.

Stored data may also be a factor in controller 130 determination of the processing path. Stored data may include important characteristics of user-specific sounds, voices, preferences or commands. System 100 may optionally comprise storage circuitry 132 to store data representing voices that, when detected, may serve as an input to the controller's logic. Storage circuitry 132 may be local as illustrated or may be remote from the hearing device. The stored data may include a so-called voice registry of known conversation partners. The voice registry may provide the information necessary for the neural network to detect and isolate specific voices from background noise. The voice registry may contain discriminative embeddings for each registered voice computed by a neural network not on the device (i.e., the large NNE), described herein as a voice signature, and the neural network on the device (i.e., local NNE) may be configured to accept the voice signatures as an input to isolate speech that matches the signature.

In addition to the voice signatures, system 100 may store different preferences for each voice in the storage circuitry (registry) 132 such that different speakers elicit different behavior from the device. NNE 150 may subsequently implement various algorithms to determine which voices to amplify relative to other sounds.

Controller 130 may execute algorithmic logic to select a processing path. Controller 130 may consider the detected SNR and determine whether one or both of DSP 140 and NNE 150 should be engaged. In one implementation, controller 130 compares the detected SNR value with a threshold value and determines which processing path to initiate. The threshold value may be one or more of empirically determined, user-agnostic or user-controlled. Controller 130 may also consider other user preferences and parameters in determining the threshold value as discussed above.

In another embodiment, Controller 130 may compute certain metrics to characterize the incoming audio as input for determining a subsequent processing path. These metrics may be computed based on the received audio signal. For example, controller 130 may detect periods of silence, knowing that silence does not require neural network enhancement and it should therefore engage DSP 140 only. In a more complex example, controller 130 may include a Voice Activity Detector (VAD) 134 to determine the processing path in a speech-isolation mode. In some embodiments, the VAD might be a much smaller (i.e., much less computationally intensive) neural network in the controller.

In an exemplary embodiment, Controller 130 may receive the output of NNE 150 for recently processed audio, as indicated by arrow 151, as input to its calculations. NNE 150, which may be configured to isolate target audio in the presence of background noise, provides the inputs necessary to robustly estimate the SNR. Controller 130 may in turn leverage this capability to detect when the SNR of the incoming signal is high enough or low enough to influence the processing path. In still another example, the output of NNE 150 may be used as the foundation of a more robust VAD 134. Voice detection in the presence of noise is computationally intensive. By leveraging the output of NNE 150, system 100 can implement this task with minimal computation overhead.

When Controller 130 utilizes NNE output 151, it can only utilize output 151 to influence the signal path for subsequently received audio. When a given sample of audio is received at the controller, the output of NNE 150 for that sample is not yet computed and so it cannot be used to influence the controller decision for that sample. But because the acoustic environment from less than a second ago is predictive of the current environment, the NNE output for audio received previously can be used.

When NNE 150 is activated, using NNE output 151 in the controller does not incur any additional computational cost. In certain embodiments, Controller 130 may engage NNE 150 for supportive computation even in a mode when NNE 150 is not the selected signal path. In such a mode, incoming audio signal is passed directly from controller 130 to DSP 140 but data (i.e., audio clips) is additionally passed at less frequent intervals to NNE 150 for computation. This computation may provide an estimate of the SNR of the surrounding environment or detect speech in the presence of noise in substantially real time. In an exemplary implementation, controller 130 may send a 16 ms window of data once every second for VAD 134 detection at NNE 150. In some embodiments, NNE 150 may be used for VAD instead of controller 130. In another implementation, controller 130 may dynamically adjust the duration of the audio clip or the frequency of communicating the audio clip as a function of the estimated probability of useful computation. For example, if recent requests have shown a highly variable SNR, Controller 130 may request additional NNE computation at more frequent intervals.

NNE 150 may comprise one or more actual and virtual circuitries to receive controller output signal 135 and provide enhanced digital signal 155. In an exemplary embodiment, NNE 150 enhances the signal by using a neural network algorithm (NN model) to generate a set of intermediate signals. Each intermediate signal is a representative of one or more of the original sound sources that constitute the original signal. For example, incoming signal 110 may comprise of two speakers, an alarm and other background noise. In some embodiments, the NN model executed on NNE 150 may generate a first intermediate signal representing the speech and a second first intermediate signal representing the background noise. NNE 150 may also isolate one of the speakers from the other speaker. NNE 150 may isolate the alarm from the remaining background noise to ensure that the user hears the alarm even when the noise-canceling mode is activated. Different situations may require different intermediate signals and different embodiments of this invention may contain different neural networks with different capabilities best suited to the wearer's needs. In certain embodiments, a remote (off-chip) NNE may augment the capability of the local (on-chip) NNE.

As discussed below in relation to FIGS. 7-10, a neural network, in the case of artificial neurons called artificial neural network (ANN) or simulated neural network (SNN), is an interconnected group of natural or artificial neurons that uses a mathematical or computational model for information processing based on a so-called connectionistic approach to computation. In most cases an ANN is an adaptive system that changes its structure based on external or internal information that flows through the network. Neural networks are non-linear statistical data modeling or decision-making tools. Such systems may be used to model complex relationships between inputs and outputs or to find patterns in data. The utility of artificial neural network models lies in the fact that they can be used to infer a function from observations and use it. This is achieved by training a model, whereby the model receives representative data as input and iteratively changes the weights of parameters in the network in a way that optimizes a given function. In supervised learning, the model works on labeled datasets whereas in unsupervised learning, the model operates on unlabeled data. These methods can be used in combination. A description of an exemplary ANN or NNE is provided in reference FIG. 10.

According to some of the disclosed principles, a neural network (which may be implemented through a neural network engine) is trained to isolate one or more sound sources. In an exemplary embodiment, this may be done through supervised learning. As input data, the model receives pairs of audio clips, one of which is a target and the other is mixed, comprising both the target signal and other signals. The training data may include clips of speakers speaking with no background noise as target and then the clips may be synthetically-mixed with recordings of background noise to form the mixed clips. Through training, the model learns to generate a complex mask for each pair of clips, which, when applied to the mixed clip, returns, on average, audio best approximating the target clips as measured by the loss function (training seeks to minimize the loss over the training dataset). By devising a model that performs well across a variety of different clips representing the task at hand, the model learns a function that can generalize audio data that it hasn't seen before. When applied to data comprising a speaker's speech and background noise, the model can estimate a signal containing only, or at least substantially, the speech content.

To produce a model that is suitable for in-person processing of audio, the model may be trained to generate an output based on inputs representing small samples of audio. The model may process audio continuously, receiving and processing each sample (or audio clip) so that it can be played back before the most recent sample has finished playing.

As an example, the model may operate on 4 ms samples of audio. At t=0, the pre-processor starts receiving data from the microphone. At t+4 ms, a controller (e.g., Controller 130 which has received the entire sample, passes the sample to NNE 150 for processing. NNE then computes an estimate for the 4 ms of audio sample (clip) and passes the intermediate signals on to the next step in the signal chain. After the remaining signal processing is complete, playback to the user begins. At t+8 ms, NNE 150 receives its next 4 ms sample clip from Controller 130. By the time the first sample has completed playing for the user (which occurs 4 ms after playback begins), the next 4 ms sample clip is ready for playback to prevent gaps. For recurrent neural networks, this means that computation would have to complete in less than the sample length, as the computation for the subsequent sample relies on updated activations from the current sample. For other model architectures, this constraint can be avoided through parallelization (at high computational cost).

In this example, the model operates on a 4 ms audio clip sample. The sample length may be expanded or contracted depending on various parameters. For example, the sample length may be less than one ms or as much as of 32 ms of data. The longer the sample length, the more the model will have to wait to provide a response and therefore the more latency the user experiences. If the model waits for a full second of audio data, it may provide excellent background noise suppression, but the user may experience an intolerable playback delay. In some embodiments the model may include a look-ahead feature whereby the model waits to receive more audio before processing, thereby increasing the information available to the model. Extending the example above, the model may wait until t+8 ms to begin processing the first 4 ms of audio (giving it a look-ahead of 4 ms) which may improve model performance but introduces additional latency. In some embodiments, total latency is kept below 32 milliseconds (or below 20 ms) to prevent an unpleasant echo for the user.

In certain embodiments, the hearing system may be configured to generate an audible signal at about 30-35 ms, 20-30 ms, 10-20 ms, 12-8 ms, 10-6 ms or 8-3 milliseconds of receipt of the incoming audio signal.

There are many variations to the disclosed training method. For example, the model may be trained to take in multiple audio streams from multiple microphones. The input data may be in the time domain, or in the time-frequency domain. The loss function may be a mean-squared error of the signal or of the complex ideal ratio mask. The input data may include additional sensor data. The input data may contain information about the desired target for the neural network, as in the example where the network is trained to isolate speech matching a certain voice signature, in which case it would also receive a signature as input data.

The model may also be trained to output each speaker separately, or multiple speakers in a single signal. The model's training target may be audio at a different SNR (rather than just speech). The model may also be trained via unsupervised techniques, allowing the model to make use of audio with no clear target. The training data may be generated synthetically or through recording contemporaneous audio streams in the real-world. The above variations are exemplary to illustrate the underlying concept and are not exhaustive of the potential variations in model training.

One exemplary embodiment of NNE 150 includes a recurrent neural network of approximately 40 million units, organized in 6 layers. The network takes as an input 8 ms clips (interchangeably, frames) of audio data and internally transforms the chips into a time-frequency representation with a short-time Fourier transform. The network may thus produce a complex mask that may be applied to the original signal to modify the phase and magnitude of each frequency. The network then outputs the clean time-domain speech signal.

In an additional embodiment, NNE 150 is comprised of a convolutional neural network of approximately 1 million units, organized into 13 layers. The first 6 layers correspond to an encoder where the input is progressively down sampled along the frequency axis via strided 1-dimensional convolutions. A Gated Recurrent Unit (GRU) layer is applied at the bottleneck layer to aggregate temporal context. The decoder contains 6 layers that progressively upsample the input from the bottleneck via transpose convolutions. The network takes as input the time-domain signal (broken up into 8 ms clips that are fed into the model in real time) containing speech and noise and outputs the corresponding time-domain clean signal.

NNE 150 then recombines the intermediate signals to generate a new signal. In some embodiments, the signals are recombined in a way that maximizes SNR by only retaining the signals (or signal components) which contain the targeted audio. For example, the modified signal may include just a target speaker's voice. In another embodiment, the recombination is done to target a preferred SNR, wherein the preference is determined by user-based criteria and user-agnostic criteria. As used herein, the SNR refers to the ratio of the powers of the intermediate signals in the combined signal, recognizing that each is itself an estimate of certain sound sources in the original signals and that such estimates are approximations.

User-based criteria may comprise user input in an application on a smartphone connected to the hearing device via wireless communication. For example, the user may have the ability to slide, or dial up and down the amount of desired background noise, which would be translated to a target SNR for the model. In another example, the user may have a preferred level of background noise stored as a setting in the application, such that when the user selects noise cancellation, the desired SNR is already known as a predefined value. In another embodiment, the SNR may be determined as a function of clinical criteria. Here, the SNR is set in a way that achieves intelligibility and comfort for the user based on the user's stored hearing profile while retaining a certain amount of ambient noise. If there are multiple intermediate signals (i.e., multiple speakers), the logic described above would be extended such that each target is adjusted to achieve a desirable SNR. Considering the constraint that noise may be constant between the two, the optimal SNR for two contemporaneous speakers may be different. The user-based criteria (i.e., user-define or user-controlled criteria) are further described in relation to FIG. 3B.

Once processed, signals components (i.e., intermediate signals) are recombined by selecting a degree of amplification that should be applied to each signal (i.e., gain). A challenge in setting the gain is ensuring that the audio is mixed in a way that realizes the target SNR without too much volatility in the gains. For example, if the SNR were targeted for every 4 ms sample of audio, the result would be nonsensical as the SNR of the incoming signal as measured over such short samples would be highly volatile and gains applied to each signal may drastically change with every 4 milliseconds. Therefore, NNE 150 may consider a slower moving average (or, stated differently, it may assess the relative volumes over longer time windows) for determining the SNR and it may react differently to changes in volume of the background noise versus changes in volume of the speaker.

User-agnostic criteria may be used to optimize audio quality. User agnostic criteria may comprise algorithms known to achieve a generally desirable user experience. For example, in the absence of personalized setting, noise cancellation may target an SNR that generally leads to improved intelligibility for people with hearing impairment. In an exemplary embodiment, SNR may be set dynamically based on the NN model performance.

Another important user-agnostic in recombination of the intermediate signals is the estimated performance of the model. Even the best trained models will struggle at extremely low SNRs (when the noise is significantly louder than the speech), same as a person with normal hearing would, because the noise completely masks the speech signal. In an exemplary embodiment, the measurement of SNR can therefore be useful as an indicator of when the model will likely fail, allowing the system to fail gracefully rather than playback inevitably garbled, unnaturally sounding estimates of the speech. In one embodiment, the model may simply not play anything back at all. In another embodiment, the model may default back to the original signal. In still another embodiment, the model may mix the estimate of the target with the original signal or mix back in some amount of the noise estimate, where the noise estimate is the difference between the original signal and the speech estimate.

In some embodiments, the neural network model may use other measures of its performance as inputs to the recombination algorithm. Certain intermediate metrics that are computed by the neural network may serve as proxies for model confidence which can be leveraged to monitor likely model failure. In one embodiment, the neural network may estimate the phase of the target signal using a gumbel softmax and the value before thresholding can be used as a per-frame measure of model confidence. The processor may include other algorithms specifically tailored to measure the quality of the model output. Some examples are metrics commonly used in speech enhancement research, such as PESQ or STOI, while others may be developed specifically for this purpose, such as a lightweight neural network trained simply to assess the quality of clean speech output.

In an exemplary embodiment, NNE 150 combines a Target SNR whereby the target SNR is generated based on the user's input (such as the user adjusting their desired level of background noise and speech in the app) with a Limit SNR, whereby the Limit SNR represents the maximum achievable SNR that the model estimates it may achieve while conforming to certain estimated performance requirements. Thus, the user may set the denoising parameter to maximum in the presence of overwhelming background noise, indicating the desire for zero background noise, but because the incoming SNR is very challenging for the model, the model may not be able to successfully enhance the incoming audio. In this case, the limit SNR is determined to be the input SNR and the audio is played back unaltered. This may be preferable to playing back a garbled audio estimate of speech).

The NNE circuitry 150 may be updated via wireless communication with a processing device or the cloud. In a preferred embodiment, an application on the user's smartphone may connect to the cloud and download an updated model (which has been retrained for better performance), which it can then transmit to the device via wireless protocol. In another embodiment, the model is retrained on the smartphone with user specific data that has been collected by recording audio at the device. Once retrained, the updated model may be transmitted to the hearing device.

In certain embodiments, NNE 150 may execute at a remote device in communication with the hearing aid. For example, NNE 150 may be executed at a smart device (e.g., smartphone) in communication with the hearing aid. The hearing aid and the smart device may communication vie Bluetooth Low Energy (BTE). In still another embodiment, parts or all of NNE 150 may be executed at an auxiliary device in communication with the hearing aid. The auxiliary device may comprise any apparatus in communication with one or more servers capable of executing machine language algorithms disclosed herein.

DSP 140 comprises hardware, software and combination of hardware and software (firmware) to apply digital signal processing to the incoming frequency bands. In certain embodiments, a significant purpose of DSP processing is to improve the audibility and intelligibility of the incoming signal for the hearing aid wearer given the user's hearing loss. Conventionally, this is done by compensating for decreased volume sensitivity in certain frequencies, decreased dynamic range and increased sensitivity to background noise. DSP 140 may implement a variety of digital signal processing algorithms to achieve dynamic range compression, amplification and frequency tuning (applying differential amplification to different frequency bands). The digital signal processing may comprise these conventional algorithms or may comprise additional processing capabilities configured to reduce background noise (e.g., stationary noise reduction algorithms). In some embodiments, DSP 140 may apply predefined gains to an incoming signal (e.g., controller output signal 135 or enhanced digital signal 155). The applied gain may be linear or non-linear and may be configured to enhance amplification of one frequency signal band relative to other bands.

In an exemplary embodiment, DSP 140 may pass an incoming signal through a filter bank. The filter bank divides the incoming signal into different frequency bands and applies a gain. The gain may be linear or non-linear to each frequency band or grouping of frequencies. The grouping of frequencies is often called a channel. In a preferred embodiment, the specific parameters of the filters, in particular the gains, are user-specific and are configured such that the end signal applies greater amplification to the frequencies where the user has greater hearing loss. The gains may be set in a way that applies greater amplification to quieter sounds than the relatively louder sounds, which compresses the dynamic range of the signal. In this embodiment, the parameters are configured as a function of the user's hearing profile, including but not limited to their audiogram. The process of tuning the parameters applied in the DSP processor to the specific individual can be done either by the individual themselves, through a fitting process in the app, or by a professional, who can program the device via software connected to the device by a wireless connection.

In another embodiment, filters and gains are set by analyzing the incoming signal in the time-frequency domain. In some embodiments, the signal is received in this form, so no STFT is needed in DSP 140, but in other embodiments, the processor receives the signal in the time domain and then applies an STFT. In some embodiments, algorithms can be applied to different frequency bands or groups of frequency bands to analyze their content and set the gains accordingly. As an example, such algorithms can be applied to identify which frequencies contain stationary noise and then these frequencies can be attenuated (receive lower gains) to improve the SNR of the signal played back. After the frequency gains are applied to the different frequency bands, the bands may be recombined into one signal.

Output 145 of DSP 140 is directed to backend/output processor 160. Backend processing circuitry 160 may comprise one or more circuitries to convert the processed signal bands 145 to audible signals in the time domain. By way of example, backend processor 160 may comprise a digital-to-analog (DAC) converter (not shown) to convert amplified digital signals to analog signals. The DAC may then deliver the analog signals to a driver and to one or more diaphragm-type speakers (not shown) to display the processed and amplified sound to the user. The speaker (not shown) may further comprise means to adjust output volume.

As stated, DSP 140 may receive the signal data from either controller 130 or NNE 150. This means that the signal may either pass through NNE 150 (receiving the associated enhancement with its corresponding computational cost) or it may pass directly to DSP 140. In either case, DSP 140 may be engaged. When NNE 150 is engaged, there are more steps in the signal processing chain which increases the system's power consumption and the time required for computation. The additional processing may introduce additional latency for the end user.

In one implementation, system 100 of FIG. 1 is formed on an IC. The IC may define an SoC. The integrated circuity may further comprise a speaker and the driver for the speaker. In the latter embodiment, integrated circuit 100 may comprise one or more communication circuitries to enable communication between circuitry 100 and one or more external devices supporting NNE 150. Such communication may include, for example, Bluetooth (BT) and Bluetooth Low Energy (BLE) or other short-range wireless technology range techniques.

As described previously, one of the major impediments to putting a neural network in the signal path is the power consumption required to run a neural network relative to the battery available for such processing. Certain embodiments of this invention therefore must achieve high degrees of efficiency as measured in operations per milliwatt in their neural network circuitry in order to achieve excellent performance while preserving long battery life.

In an exemplary embodiment, around 10 milliwatt hours of this battery can be freed up for neural network processing by targeting slightly less runtime or increasing the battery size. Batteries found in traditional rechargeable hearing aids and headphones have a typical capacity of around 300 milliwatt hours. For a user to be able to use speech enhancement features and live an active and social life, they would ideally have access to 10 hours of neural network processing, which means that the neural network circuitry can only consume 1 milliwatt of additional power when activated. Achieving a chip performance of 2-3 billion operations per milliwatt therefore creates a computational budget of 2-3 billion operations per second for the neural network, which is sufficient to speech isolation. In other embodiments, targeting lower total runtime (thereby allocating more battery budget to the neural network) or targeting less neural network runtime (thereby increasing the per-second budget for the neural network) allow a larger computational budget for the neural network.

To achieve efficient signal processing, DSP 140 and NNE 150 may be located on separate cores on the chip with different architectures that fit their respective tasks. For example, the neural network circuitry may be configured for low-precision numerics with 8-bit (or less) arithmetic logic units. It may also be configured for efficient data movement, ensuring that all the data necessary for computation is stored within the SOC. In some embodiments this neural network core may also be configured such that the same processors used for executing the neural network can be used for more traditional DSP operations, like 24-bit arithmetic. In some embodiments, therefore, DSP 140 and NNE 150 can be executed in the same processor.

Figure 2:
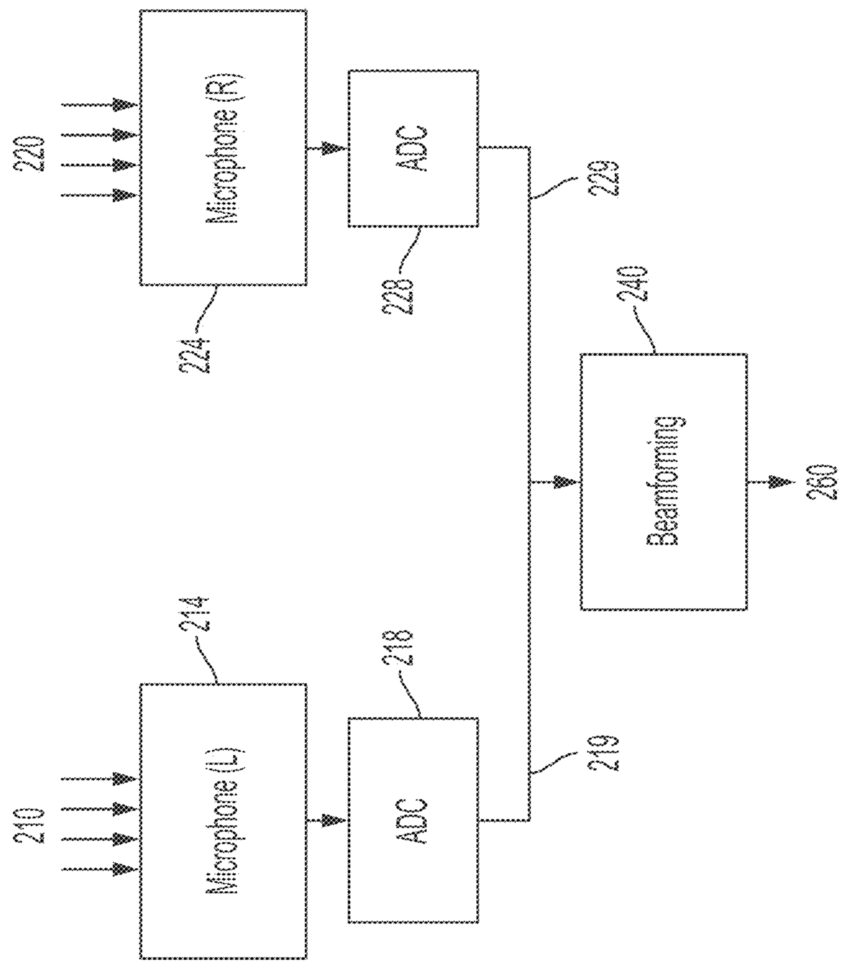
FIG. 2 schematically illustrates an exemplary frontend receiver according to an embodiment of the disclosure.

FIG. 2 schematically illustrates an exemplary frontend receiver 200 according to an embodiment of the disclosure. In FIG. 2, incoming sounds which may be a combination of voice and ambient noise are received at microphones 214 and 224. Microphones 214 and 224 correspond to separate devices on left and the right side of user's head and receive input sounds identified as 210 and 220, respectively. In some embodiments, each device includes multiple microphones. Microphones 214 and 224 direct received signals 210 and 220 to ADC 218 and 228, respectively, ADCs 218, 228 convert the received time-varying signals 210, 220 to their corresponding digital representatives 219, 229. Once digitized, signals 219 and 229 may be passed to Controller 130 in their respective devices. In some embodiments, they are additionally passed to the controller in the opposite device, allowing for processing of binaural input data.

Figure 3A:
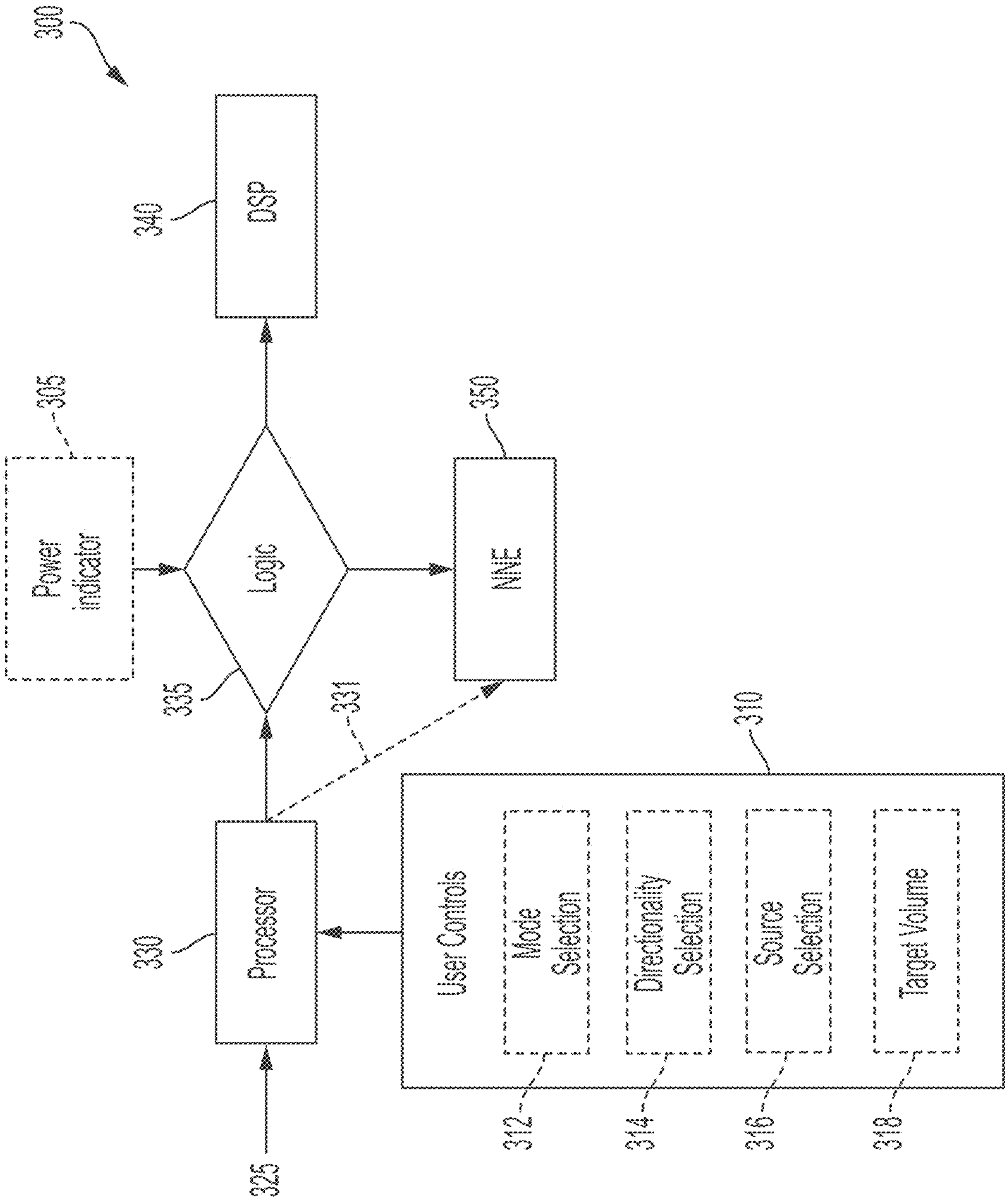
FIG. 3A is a schematic illustration of an exemplary system according to one embodiment of the disclosure.

FIG. 3A is a schematic illustration of an exemplary system according to one embodiment of the disclosure. Specifically, FIG. 3A illustrates an exemplary decision-making process which may be implemented at a control system. Controller 300 may serve as a signal processor to perform certain transformations and calculations on the incoming signal (e.g., 110 or 125, FIG. 1) to put the incoming signal into the form required for processing and to select the next processing step. In some embodiments, Controller 300 may function as a selector switch to optimize user's selections, preferences and power consumption. In certain embodiments, controller system 300 may determine when to engage the larger NNE based on the user's preferences to amplify the user's preferred sounds.

Controller system, 300 of FIG. 3A may be executed in a hearing aid or at a headphone. The controller may be integrated with the hearing device as hardware, software or a combination of hardware and software. Controller system 300 includes processor circuitry 330 which receives audio signal 325. The audio signal may be digital (e.g., 125, FIG. 1) or it may be time-varying (e.g., 110, FIG. 1). When the signal is time-varying, an additional ADC (not shown) may be used. As stated in relation to FIG. 1, the digital audio signal may comprise multiple components including one or more voice signals and ambient or background noise.

Processor 330 may receive user inputs from user control 310. The user inputs may comprise user's preferences which may be dialed into the system from an auxiliary device (see, e.g., FIG. 3B) such as a smartphone. Certain user preferences may provide amplification parameters or preferences concerning the relative amplification of different sounds which in turn may determine the SNR. For example, a user may prefer voice amplification over other ambient sounds. User preferences may be obtained through a graphic user interface (GUI) implemented by an app at an auxiliary device such as the user's smartphone. User controls may be delivered wirelessly to process circuitry 330. User controls 310 may comprise Mode Selection 312, Directionality Selection 314, Source Selection 316 and Target Volume 318. These exemplary embodiments are illustrated below in reference to FIG. 3B.

In one exemplary embodiment, system 300 may optionally include a module (not shown) to receive and implement the so-called wake words. Wake word may be one or more special words designated to activate a device when spoken. Wake words are also known as hot-words or trigger words. Processor 330 may have a designated wake word which may be utilized by the user to activate NNE 350. The activation may overwrite processor 330 and decision logic 335 and direct the incoming speech to NNE 350. This is illustrated by arrow 331.

While decision logic 335 is illustrated separately, it may optionally be integrated with processor circuitry 330. Decision logic 335 determines when to engage NNE 350 and the extent of such engagement. Decision logic 335 may apply decision considerations provided by the user, the NNE or a combination of both. Decision logic 335 may optionally consider the input of power indicator 305 which indicates the available battery level. Decision logic 335 may also utilize such consideration to determine the extent of NNE engagement. Decision logic 335 determines whether to engage NNE 350 (or a portion thereof), DSP 340 or both. When selected, DSP 340 filters incoming signal 325 to a myriad of different frequency bands. Processor 330 and decision logic 335 may collectively determine when to engage NNE 350. For example, processor 330 may use its own logic in combination with user input to determine that incoming frequency bands 325 comprise only background noise and not engage NNE 350.

The received frequency bands may comprise as many as 400 or more bands. DSP 340 then allocates a different gain to each frequency band. The gains may be linear or non-linear. In one embodiment, DSP 340 sets ideal gains for each frequency to significantly eliminate noise.

Figure 3B:
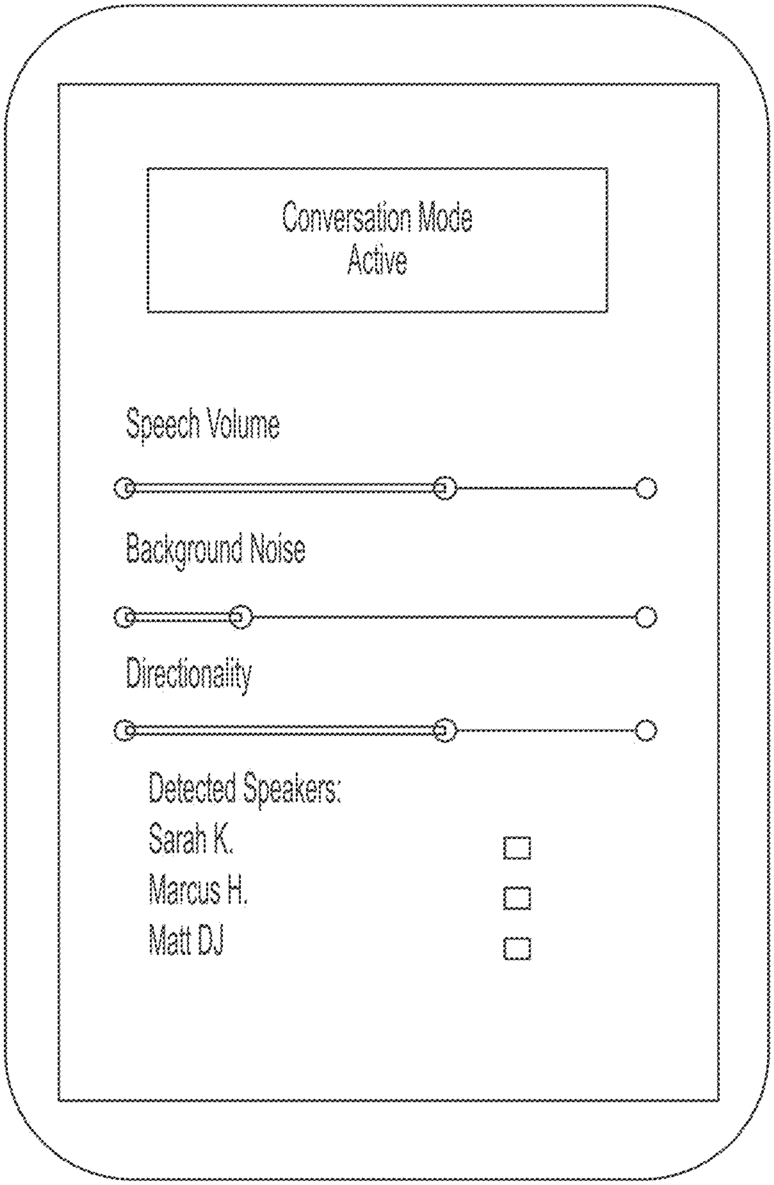
FIG. 3B shows Speech Volume, Background Noise level controls and Mode switches.

FIG. 3B illustrates an exemplary Graphic User Interface (GUI) according to one embodiment of the disclosure. The GUI may be implemented as an app on a smart device. The GUI allows user's preferences to be communicated to the hearing device. Speech Volume and Background Noise may be configured to allow the user to input amplification preferences for speech and noise respectively. Directionality is an additional input allows the user to increase the relative volume of noises coming from one direction relative to user (typically in front, though in other embodiments, the user may also be able to select a different direction). Detected speakers allows the user to select certain speakers whose voice to amplify versus (as compared with other voices which may be treat as noise). Mode selection 312 allows the user to select operation mode for the device (exemplified by Conversation Mode Active). In some embodiments, the selectable modes may include conversation mode, ambient mode and automatic mode. If ambient mode is selected, then NNE 150 may be disengaged. Other modes such as Voice mode may indicate that denoising is desired. Automatic Mode may indicate that processor 330 should make its best prediction of when to turn on NNE 150 to match user preferences (e.g., when the user is engaged in conversation and there is background noise).

Each of the Total Volume, Speech Volume, Background Noise and Directionality may have a dial or slider on the user's device to implement the user's specific preferences. Additional controls may be included to correspond to one or more sound categories or sound sources. In some embodiments, the dial on the device can act as a volume control for a configured sound class, like speech or background noise. Turning the dial may convey a higher or lower User-defined SNR target for recombining the outputs of the neural network. In some embodiments, one device may have a dial for ambient volume control while the other may have a dial that changes the level of the background noise. In some embodiments, a single dial may adjust SNR by dynamically adjusting either the Speech Volume or the Noise Volume based on the starting SNR or the incoming volume. For example, the SNR might be increased initially by incrementally decreasing the volume of the background noise in the output signal, but once the background noise is totally gone, then further improvements in SNR can be achieved by increasing the volume of the speech signal (since the speech signal still has compete with sound that is entering the ear around the hearing device). In some embodiments, the physical dial may specifically configured in settings on a smartphone app to assign different behaviors.

FIG. 3B shows Speech Volume, Background Noise level controls and Mode switches. These parameters (along or in combination with others) two may be used to determine the user's desired denoising level. With reference to FIG. 3A, the user's preferred denoising level may be communicated to NNE 350 through processor 330 or may be input directly to NNE 350 (not shown). When engaged, NNE 350 may identify different sound sources and separate the incoming signal accordingly. Given the user's preferred denoising level, NNE 350 may then apply appropriate amplification gains to the target sounds and the noise.

In one embodiment, source selection 316 allows the user to pre-identify certain voices and match the identified voices with known individuals. Source selection 316 may be implemented optionally. NNE 350 or a subset thereof may be executed to allow the user to implement source selection. Upon matching an incoming frequency band with an identified individual, system 300 may implement steps to isolate and amplify the individual's voice over ambient noise. The identified voices may include those of caregivers, children and family members. Other sounds including alarms or emergency sirens may also be identified by the user or by system 300 such that they are readily isolated and selectively amplified. In one embodiment, source selection 316 allows user to identify one or a group of sounds for amplification (or de-amplification).

Figure 4:
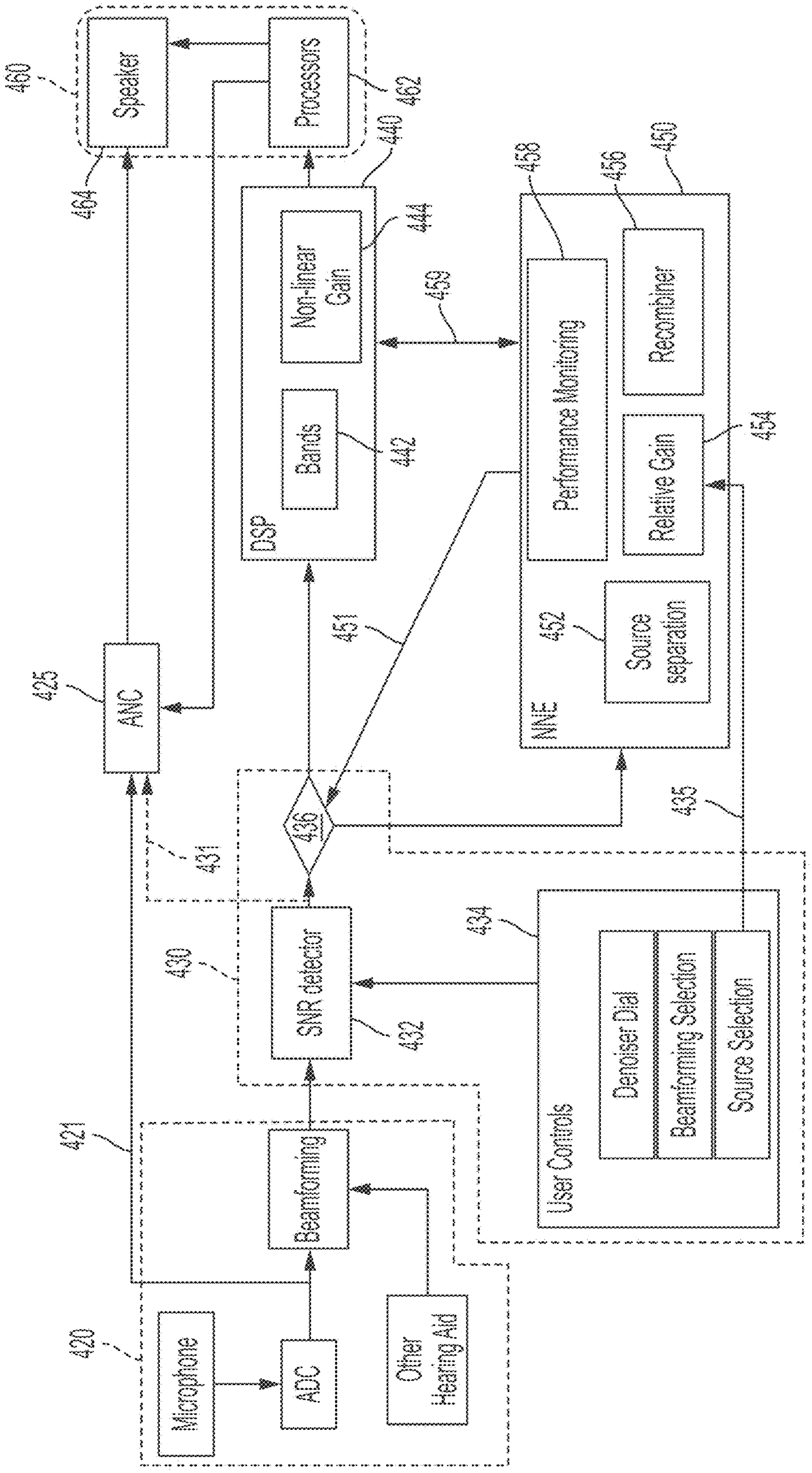
FIG. 4 illustrates a signal processing system according to another embodiment of the disclosure.

FIG. 4 illustrates a signal processing system according to another embodiment of the disclosure. The system of FIG. 4 may be implemented in a hearing device according to the disclosed principles. In FIG. 4, receiver 420 is shown with frontend receiver 420 which as discussed in relation to FIG. 2, combines incoming signals from different microphones into one digital signal. Controller system 430 includes user controls 434, SNR detector 432 and decision logic 436.

Decision logic 436 communicates with both DSP 440 and NNE 450 as described in relation to FIG. 3A. In FIG. 4, NNE 450 provides additional feedback to decision logic 436 as indicated by arrow 451. In some embodiments, NNE 450 will measure the estimated SNR of the incoming signal, which can in turn serve as an input to logic 436. If the SNR is extremely high, then NNE 450 may no longer be necessary. If the SNR is exceptionally low such that no voice is detected, then NNE 450 may not be useful. In some embodiments, sending data to NNE 450 intermittently provides a way to measure characteristics of the sound signal without burning power constantly.

The exemplary NNE 450 of FIG. 4 includes exemplary modules: source separation 452, relative gains 454, recombiner 456 and performance monitoring 458. When activated, source separation 452 receives the incoming audio signal in frames. Audio can be received in the time domain or time frequency domain. For example, the frames maybe for a duration of 10, 14, 16 or 20 millisecond long. In some embodiments the frames may be less than a millisecond or longer than 30 milliseconds. Each frame is processed through the neural network, with the neural network outputting one or more complex masks that can be used to isolate one or more sound sources. Applying these masks allows source separation module 452 to filter each frame down to the sound sources. Noise can be found either by generating a mask for noise or by subtracting all other separated sources from the original signal, such that noise is the remainder.

Relative gain module receives the user's auditory preferences from user control 434 and applies one or more relative gains to each of the frames received from source separation 452. The gains applied to the different frequency bands at the NNE 450 can be non-linear (as compared to gains applied at DSP 440). The implementation allows different gains to be applied at the source and at per-frame level.

Figure 5A:
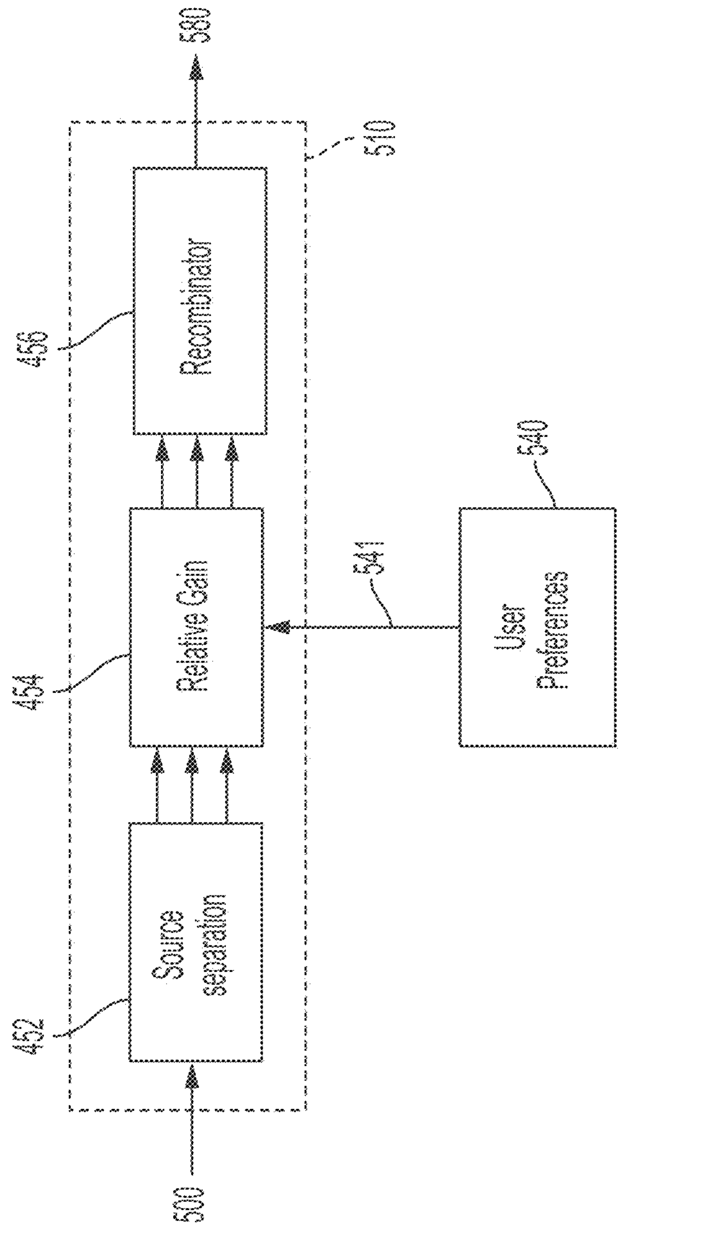
FIG. 5A illustrates an interplay between user preferences and the non-linear gain applied by an exemplary NNE according to one embodiment of the disclosure.

FIG. 5A illustrates an interplay between user preferences and the non-linear gain applied by an exemplary NNE according to one embodiment of the disclosure. In FIG. 5A, incoming sound in the form of digitized signal 500 is directed to NNE 510. Source separation 452 divides the incoming sound into different data streams as a function, for example, of their respective sound sources. This data is then directed as different bands to relative gain filter 454, which applies different gains based on user's preferences as indicated by arrow 435. User's preferences 540 determine the optimal combination (or optimal weights) of various sound sources. Recombiner 456 then combines the differentially weighted frequency bands to form a combined signal 580.

Referring again to FIG. 4, NNE 450 directs the recombined audio stream to DSP 440 for further processing. In this manner and according to one embodiment, components of NNE 450 estimate an ideal ratio mask that separates speech signal from noise signal, apply differential gain to each of the identified speech and noise signals and combine the differentially amplified signals into one data stream.

Performance monitoring module 458 may be used optionally. In one embodiment, performance monitoring module 458 examines the output signal of NNE 450 to determine if the output signal is within the auditory requirement standard. If the output signal does not satisfy the requirement, then performance monitoring module 458 may signal decision logic 436 to divert the incoming signal to DSP 440 directly. This is illustrated by arrow 451. Otherwise, NNE output can be directed to DSP 440 as illustrated by arrow 459. In another embodiment, Performance Monitoring 458 can act as an input to Relative Gain 454, wherein the aggressiveness of the noise suppression can be limited when Performance Monitoring 458 detects errors in Source Separation 452.

DSP 440 includes, among others, filter bank 442 to separate the incoming signal into different frequency bands and non-linear gain filter 444 which applies a gain to a respective band. In one implementation, each filter identifies noise component within each distinct band and applies noise cancellation gain to cancel the noise component.

Active noise cancellation (ANC) 425 is placed in the signal path between frontend receiver 420 and backend receiver 460. ANC may optionally be used. ANC 425 may comprise processing circuitry configured to receive an ADC signal from a hearing aid microphone and process the signal to improve the signal-to-noise ratio (SNR). Conventional ANC techniques may be used for noise cancellation. The input to ANC 425 may be the incoming signal 421, optionally controller signal output 431 or both. The ANC process may be implemented on each unit of a hearing aid device to address the noise intangibles associated with each unit. In one embodiment of the disclosure, ANC 425 may remain engaged even absent user control input 434 or without the engagement of DSP or NNE engagement. Given the latency of processing the audio through a neural network and the low-latency requirements for ANC, ANC is applied to the whole incoming signal (including both speech and noise components) and then the system plays back speech after processing is complete.

Backend processor 460 includes speaker 464 as well as optional processor circuitry 462. Speaker 464 may include conventional hearing aid speakers to convert the processed digital signal into an audible signal.

Figure 5B:
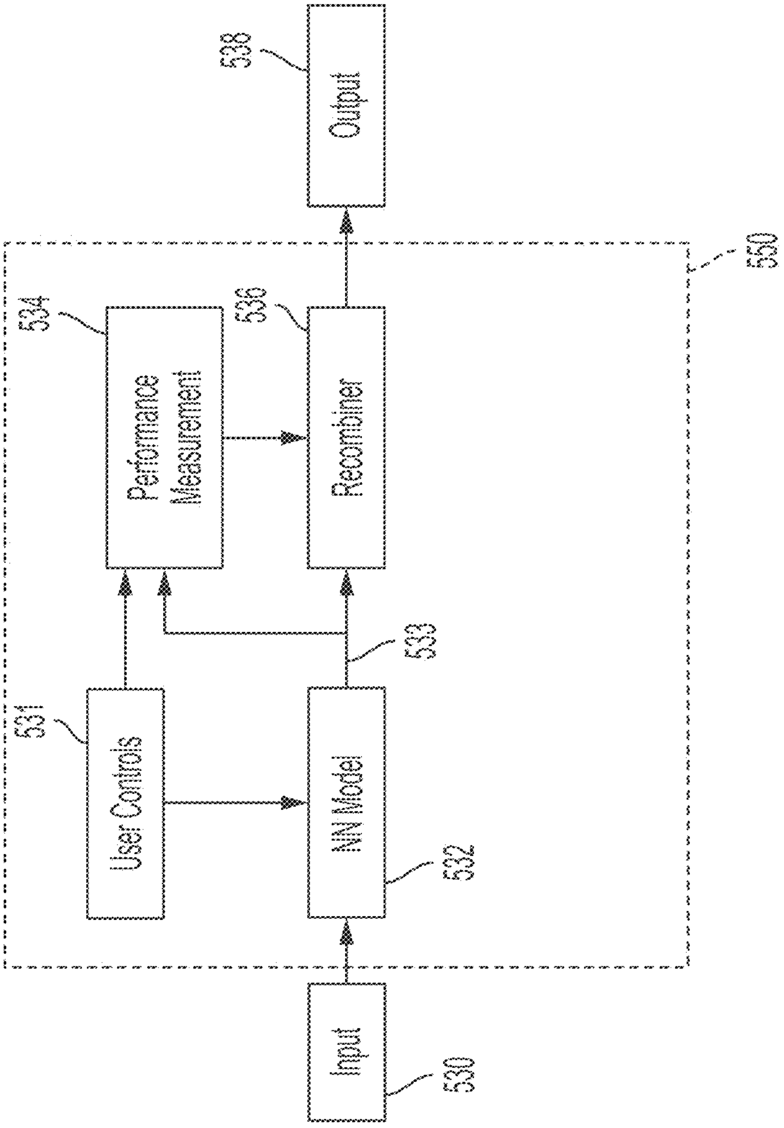
FIG. 5B is an illustration of an exemplary NNE circuitry logic implemented according to one embodiment of the disclosure.

FIG. 5B is an illustration of an exemplary NNE circuitry logic implemented according to one embodiment of the disclosure. The logic may be implemented at NNE engine circuitry 550. The received audio signal is indicated as input 530. The received audio signal is directed to the neural network (NN) model 532. NN model 532 may comprise an exemplary algorithm to separate sound sources or enhance SNR according to the disclosed embodiments. NN model 532 may comprise hardware, software or a combination of hardware and software. NN model 532 receives the user's preferences in the form of user controls 531 as discussed, for example, in relation to FIG. 3B. An output of NN model 532 (NN output signal 533) is directed to performance measurement unit 534. Performance Measurement 534 implements metrics that are used to predict the performance or predict the error of the neural network. These predictions can further be used as inputs in Recombiner 536, which seeks to optimize the way in which model outputs are recombined to form a final signal. Recombiner 536 takes into account both the user preferences as expressed from User Controls 531 and output of Performance Measurement 534 to optimally recombine the outputs of NN Model 532.

In an exemplary embodiment, performance measurement unit 534 receives output signal 533 in sequential frames and determines an SNR for each frame. The measurement unit then estimates an average SNR for the environment, which can be used to predict model error (since model error typically increases at more challenging input SNRs). Recombiner 536 also receives user's preferences from User Controls 531. Given, the user's preferences and the estimated SNR, Recombiner 536 then determines a set of relative gains to be applied to signal 533 and communicates the gain values to recombiner 536. In an exemplary embodiment, the Recombiner seeks to set the gains to best match user preferences while keeping total error below a certain threshold.

Recombiner 536 applies the gain values to the NN output signal 533 to obtain output 538 signal. In one embodiment, a plurality of gain values is communicated to recombiner 536. Each gain values corresponds to an intermediate signal, which in turn corresponds to a sound source. Recombiner 536 multiplies each gain value to its corresponding intermediate signal and combines the results to produce output 538.

The following examples illustrate certain non-exhaustive implementations of the disclosed principles.

Example 1—The average SNR value of signal 533 is below the threshold at which speech can be reliably separated (the audible speech threshold). In this example, regardless of the user's preferences and system capabilities, neural network processing will be ineffective. In this case, performance measurement unit 534 may either set the gains so that the incoming signal is unaltered, or, to preserve battery power, relay a signal to Controller 130 as shown in FIG. 1 to temporarily turn off neural network processing.

Example 2—The average SNR value of signal 533 is above the audible speech threshold and user's preferences are applied. In this example, because the SNR value of signal 533 is above the audible speech threshold, Recombiner 536 may determine suitable gains. The gains may be determined as a function of the user's preferences and estimated model error. Performance measurement unit 534 will then determine the gains that best approximate the SNR that the user desires while keeping model error as heard by the user below a certain threshold.

Example 3—The average SNR value of signal 533 is above the audible speech threshold and Recombiner 536 is aware of the user's preferences. Recombiner 536 may ignore the user's preferences in favor of estimating and applying a different set of relative gains. This may be because of the understanding that a higher quality sound may be obtained by applying different gain criteria. In this example, Recombiner 536 substitutes its own standards for providing audible output signal 538 which may or may not exceed the user's SNR preferences. Thus, the system operates with the NNE circuitry in the signal path to provide an audible signal in substantially real time while gracefully handling limitations of deep learning models in real-world environments.

Figure 5C:
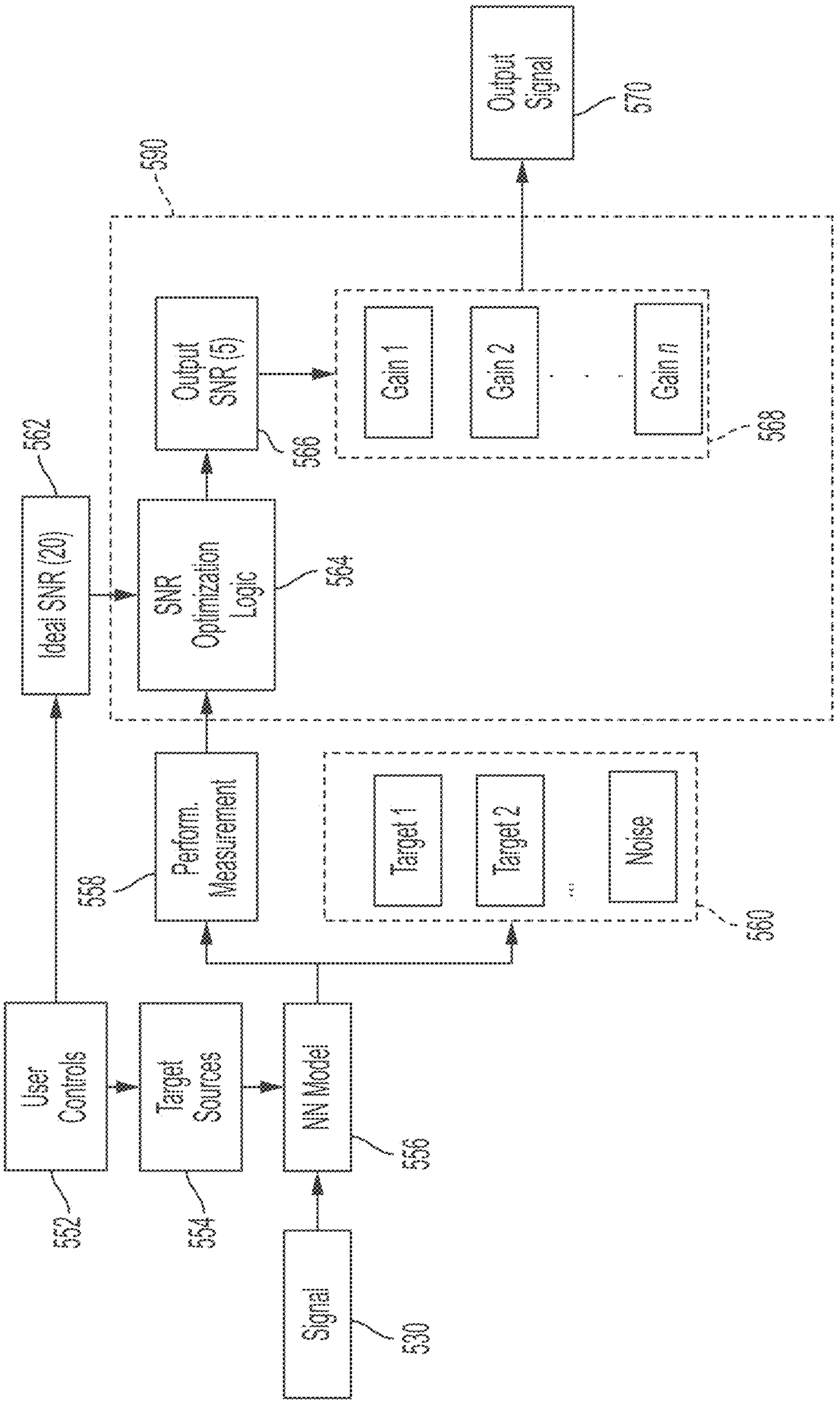
FIG. 5C schematically illustrates an exemplary architecture for engaging the NNE circuitry according to one embodiment of the disclosure.

FIG. 5C schematically illustrates an exemplary architecture for engaging the NNE circuitry according to one embodiment of the disclosure. The architecture of FIG. 5C may be implemented at an NNE circuitry. In FIG. 5C, the incoming signal 550 is received at NN model 556. User preferences in the form of user control 552 and target sources 554 are also provided to NN model 556. Target sources 654 may comprise one or more identified sources, for example, known speakers'voices or the user's own voice which have been identified and stored apriori.

User's preferences 652 may also be used to set the user's ideal SNR 662. The ideal SNR 562 may define a threshold SNR value which accommodates the user's personal preferences and audio impairment. For example, ideal SNR 562 may target an output SNR of 10 db, either because that is the balance conveyed in the user controls on the smartphone, or simply because the user's hearing profile is such that 10 db is the minimum SNR at which the person can still reliably follow speech without effort.

NN model 556 outputs signal to performance measurement unit 558. A general description of the performance measurement unit was provided in relation to FIG. 5B and will not be repeated here. In FIG. 5C, the performance measurement unit 558 identifies intermediate signals 560 which may include, for example, target frequency bands and a noise band. Recombiner 590 may be equipped with SNR optimization logic 564. Optimization logic 564 receives the user's ideal SNR 562 as well as the output from the performance measurement unit 558 and determines whether to apply or to deviate from the user's preferences (i.e., ideal SNR 562). The result is a determination of a set of gain values 568 which are then applied to intermediate signals 560, respectively, to provide output signal 570. It should be noted that in the exemplary embodiment of FIG. 5C, recombiner 590 also applies optimization logic 564 to determine gain values 568.

In an exemplary embodiment, Performance Measurement 558 outputs a Limit SNR, which is an output SNR that keeps audible distortion introduced by model error below a certain threshold. SNR Optimization Logic then compares the Ideal SNR as determined based on user preferences with the Limit SNR and takes the lower of the two. Gains are then set to target the SNR determined by this function.

Example 4—In this example, compliance with user's preferred SNR 562 may require output signal having an SNR of about 10 db. SNR optimization logic 564 may compare this value with available system bandwidth to impose a limit of −5 db for the output signal 570. The gain values are then determined based on the −5 db SNR. In this manner, SNR optimization logic 564 acts as an SNR limiter.

Thus, according to certain disclosed principles, the NN model may be executed on small audio frames, for example, once every second to obtain preliminary SNR values. The frequency and duration of the audio frame testing may be changed.

Figure 6:
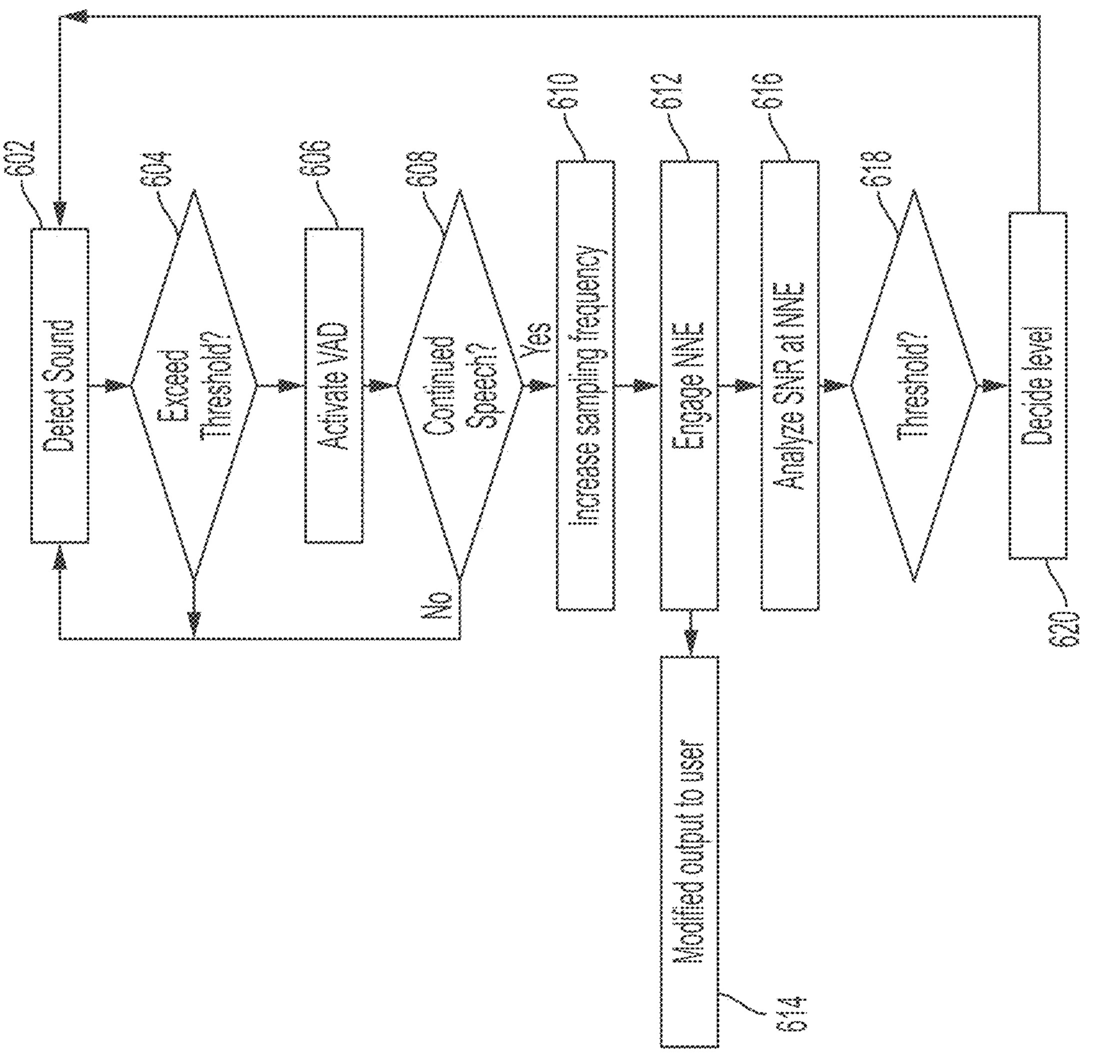
FIG. 6 is a flow diagram illustrating an exemplary activation/deactivation of an NNE circuitry according to one embodiment of the disclosure.

FIG. 6 is a flow diagram illustrating an exemplary activation/deactivation of an NNE circuitry according to one embodiment of the disclosure. Such a flow would be executed in Controller 130 in FIG. 1. In one implementation, the exemplary process aims to minimize system power consumption while enhancing user experience. The disclosed process may be implemented at hardware, software or a combination of hardware and software. The disclosed process may be implemented at various parts of a system disclosed herein. For example, certain steps may be implemented at the frontend receiver, others may be implemented at the controller and still other steps may be implemented at the NNE and the DSP circuitries.

In one embodiment, the system monitors the incoming sound without continually engaging the NNE circuitry. This may be implemented by tiering the logic such that more computationally demanding tasks (i.e., power expensive calculations) are executed only when necessary.

Referring to FIG. 6, at step 602 the system detects incoming sound. Step 602 may be implemented at the controller with relatively low computation cost. Conventional sound detection mechanism may be used for step 602. Upon sound detection, the system determines if the detected sound exceeds a predefined threshold. This is illustrated at step 604. If the threshold is not met, then the system reverts to step 602 and continues to detect incoming sound. Steps 602 and 604 may operate continually or may be executed intermittently. These steps may be implemented at a frontend receiver or elsewhere in the system.

Sound detection may be done at one or both sides of the hearing aid device. Sound detection may be implemented at low-power mode by analyzing audio frames at infrequent intervals. If the detected sound level exceeds a predefined threshold, at step 606, VAD may be activated. At step 608, VAD determines if there is the detected speech is continual. If the detected speech is not continual, then the process reverts to step 602. If the detected speech is continual, then at step 610 the sampling frequency of the incoming audio may be increased. Once activated, the logic may search for sustained speech through more frequent sampling of the incoming audio.

At step 612, the system engages the NNE circuitry to further process the incoming audio signals. When engaging the NNE circuitry, the system may consider several competing interests. For example, the system may consider the user's inputs, the NNE's ability to provide a meaningful SNR (i.e., NNE's performance limits) and power availability. In certain embodiments, once continual speech is detected then a full NNE circuitry may be engaged to analyze the incoming audio while still not modifying the output to the user. This allows the device to analyze the SNR of incoming audio and determine if activating NNE is preferable.

At step 614, the output is optionally modified according to the user's settings and an audio stream is delivered to the user if NNE is activated. In addition, the NNE may use the same model outputs to analyze the SNR for the incoming audio stream or audio clips to inform whether NNE should remain activated.

At step 618, the controller, having received the SNR feedback from the NNE, determines if the SNR exceeds the NNE's limit to provide audible speech. For example, if the SNR of the incoming audio is very high (it's a conversation in a quiet room), then NNE processing is unnecessary. To do so, the system may look to a threshold SNR level set by the user of by the device itself (e.g., when the auto mode is selected). If the SNR is high enough that the NNE, even at full engagement, is incapable to provide audible speech, then the system may decline filtering as discussed above. If the NSR level does not exceed the NNE's limits, then the algorithm may process the incoming signals at a level determined by the system or by the user (i.e., select a level that is the lower of the target SNR or the NNE limit SNR). This step is illustrated as step 620 of FIG. 6. Thereafter, the process may revert to step 602.

Figure 7:
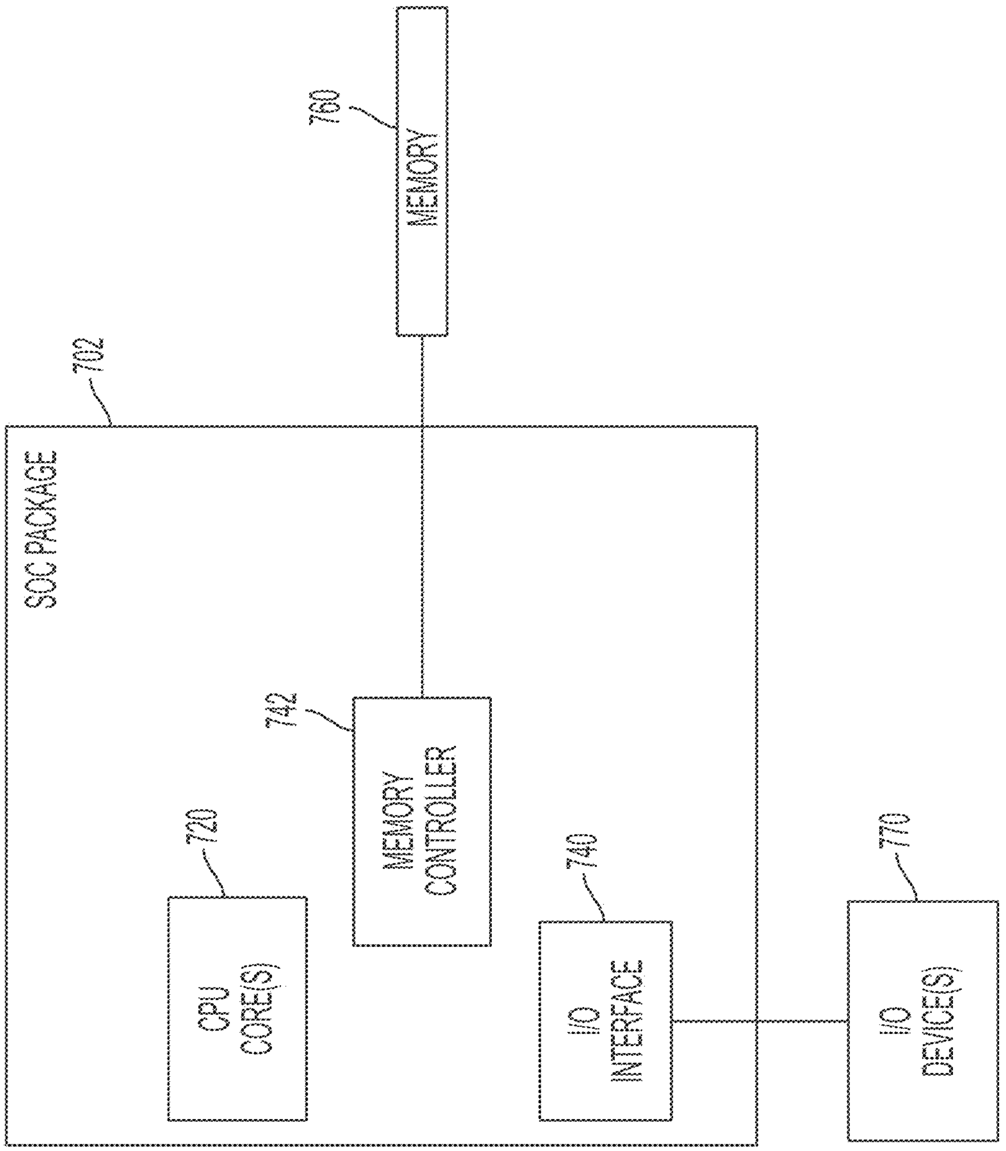
FIG. 7 illustrates a block diagram of an SOC package in accordance with an embodiment.

FIG. 7 illustrates a block diagram of an SOC package in accordance with an exemplary embodiment. In FIG. 7, SOC 702 includes one or more Central Processing Unit (CPU) cores 720, an Input/Output (I/O) interface 740, and a memory controller 742. Various components of the SOC package 702 may be optionally coupled to an interconnect or bus such as discussed herein with reference to the other figures. Also, the SOC package 702 may include components such as those discussed with reference to the hearing aid systems of FIGS. 1-6. Further, each component of the SOC package 720 may include one or more other components, e.g., as discussed with reference to FIG. 2 or 3. In one embodiment, SOC package 702 (and its components) is provided on one or more Integrated Circuit (IC) die, e.g., which are packaged into a single semiconductor device. The single semiconductor device may be configured to be used as a hearing aid, an amplification system or a hearing device to be used in the human ear canal.

As illustrated in FIG. 7, SOC package 702 is coupled to a memory 760 via the memory controller 742. In an embodiment, the memory 760 (or a portion of it) can be integrated on the SOC package 702. The I/O interface 740 may be coupled to one or more I/O devices 770, e.g., via an interconnect and/or bus such as discussed herein. I/O device(s) 770 may include means to communicate with SOC 702. In an exemplary embodiment, I/O interface 740 communicates wirelessly with I/O device 770. SOC package 702 may comprise hardware, software and logic to implement, for example, the embodiment of FIGS. 1 and 4. The implementation may be communicated with an auxiliary device, e.g., I/O device 770. I/O device 770 may comprise additional communication capabilities, e.g., cellular or WiFi to access an NNE.

Figure 8:
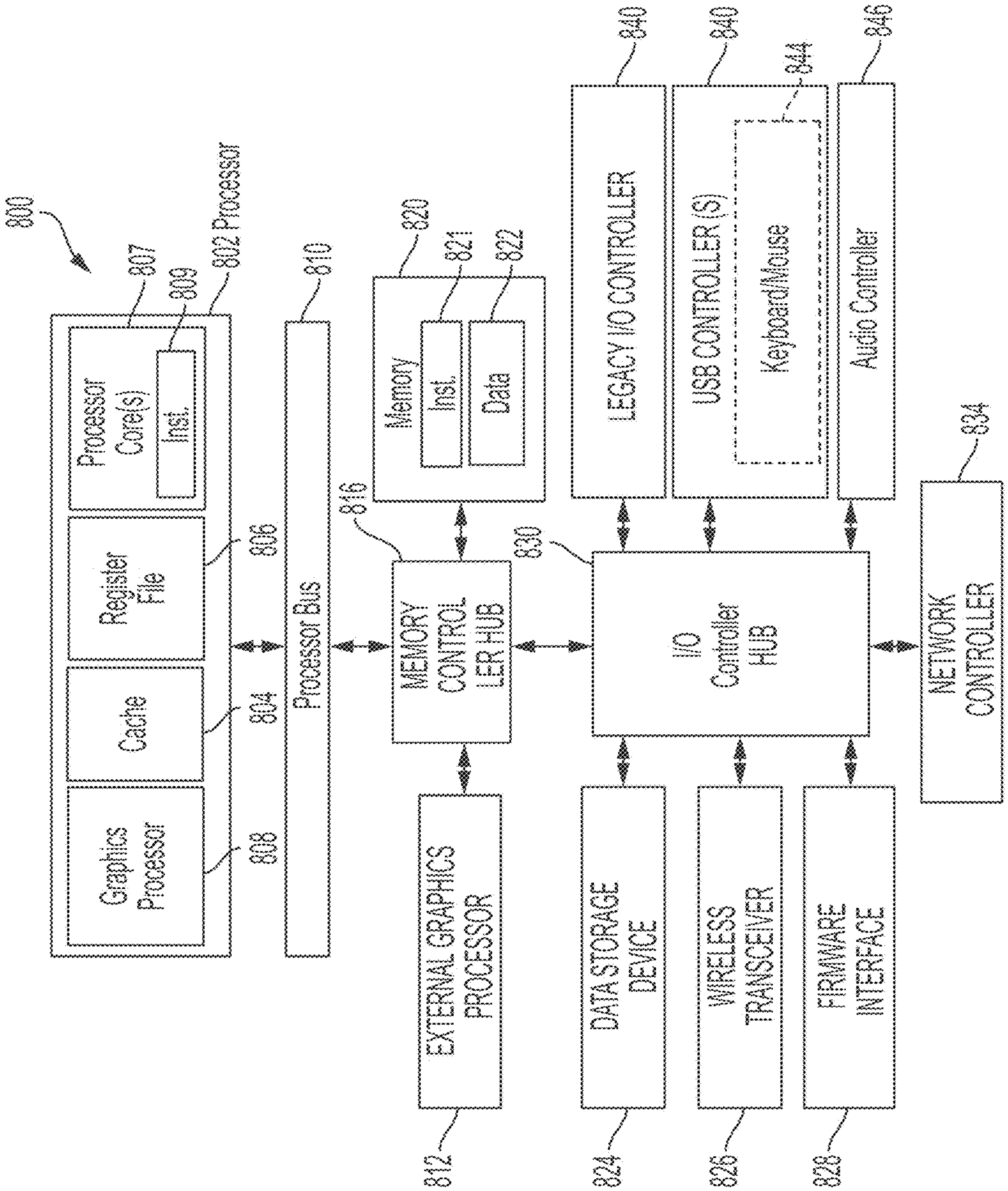
FIG. 8 is a block diagram of an exemplary auxiliary processing system which may be used in connection with the disclosed principles.

FIG. 8 is a block diagram of an exemplary auxiliary processing system 800 which may be used in connection with the disclosed principles. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include or be incorporated within a server-based smart-device platform or an online server with access to the internet. In some embodiments system 800 is a mobile phone, smart phone, tablet computing device or mobile Internet device. Data processing system 800 can also include couple with, or be integrated within a wearable device, such as a smart watch wearable device, smart eyewear device (e.g., faceworn glasses), augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 88 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 88. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
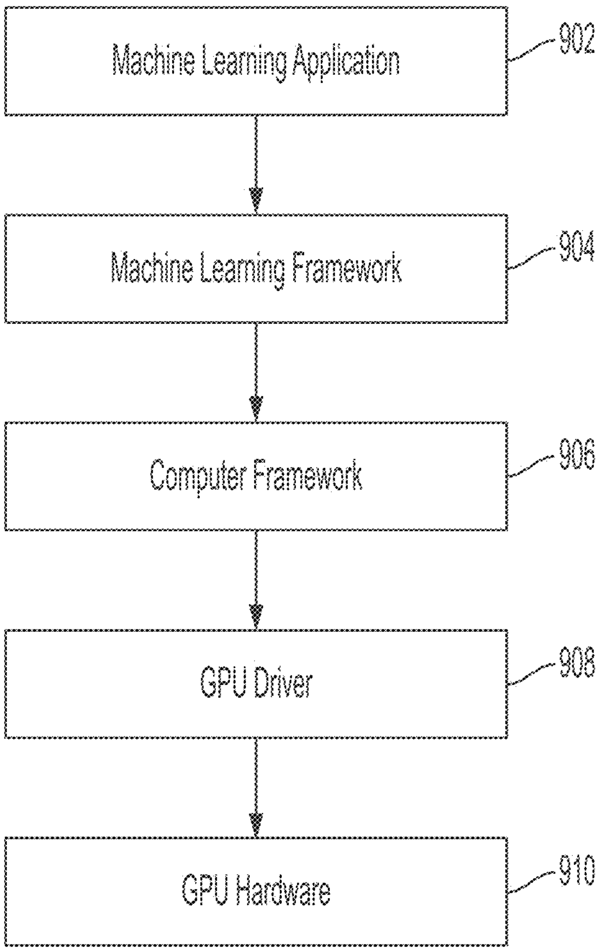
FIG. 9 is a generalized diagram of a machine learning software stack in accordance with one or more embodiments.

FIG. 9 is a generalized diagram of a machine learning software stack 900. A machine learning application 1102 can be configured to train a neural network using a training dataset or to use a trained deep neural network to implement machine intelligence relating to the disclosed principles. The machine learning application 902 can include training and inference functionality for a neural network and/or specialized software that can be used to train a neural network before deployment on a hearing device. The machine learning application 902 can implement any type of machine intelligence including but not limited to image recognition, mapping and localization, autonomous navigation, speech synthesis, medical imaging, or language translation.

Hardware acceleration for the machine learning application 902 can be enabled via a machine learning framework 904. The machine learning framework 904 can provide a library of machine learning primitives. Machine learning primitives are basic operations that are commonly performed by machine learning algorithms. Without the machine learning framework 904, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 904. Exemplary primitives include tensor convolutions, activation functions, and pooling, which are computational operations that are performed while training a convolutional neural network (CNN). The machine learning framework 904 can also provide primitives to implement basic linear algebra subprograms performed by many machine-learning algorithms, such as matrix and vector operations.

The machine learning framework 904 can process input data received from the machine learning application 902 and generate the appropriate input to a compute framework 906. The compute framework 906 can abstract the underlying instructions provided to the GPGPU driver 908 to enable the machine learning framework 904 to take advantage of hardware acceleration via the GPGPU hardware 910 without requiring the machine learning framework 904 to have intimate knowledge of the architecture of the GPGPU hardware 910. Additionally, the compute framework 1106 can enable hardware acceleration for the machine learning framework 904 across a variety of types and generations of the GPGPU hardware 910.

The computing architecture provided by embodiments described herein can be configured to perform the types of parallel processing that is particularly suited for training and deploying neural networks for machine learning implementation on hearing devices. A neural network can be generalized as a network of functions having a graph relationship. As is known in the art, there are a variety of types of neural network implementations used in machine learning. One exemplary type of neural network is the feedforward network, as previously described.

A second exemplary type of neural network is the CNN. A CNN is a specialized feedforward neural network for processing data having a known, grid-like topology, such as image data. Accordingly, CNNs are commonly used for compute vision and image recognition applications, but they also may be used for other types of pattern recognition such as sudatory, speech and language processing. The nodes in the CNN input layer are organized into a set of filters (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for auditory processing due to the variable nature in which auditory data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning to implement one or more of the disclosed principles. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, noise and/or speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 10:
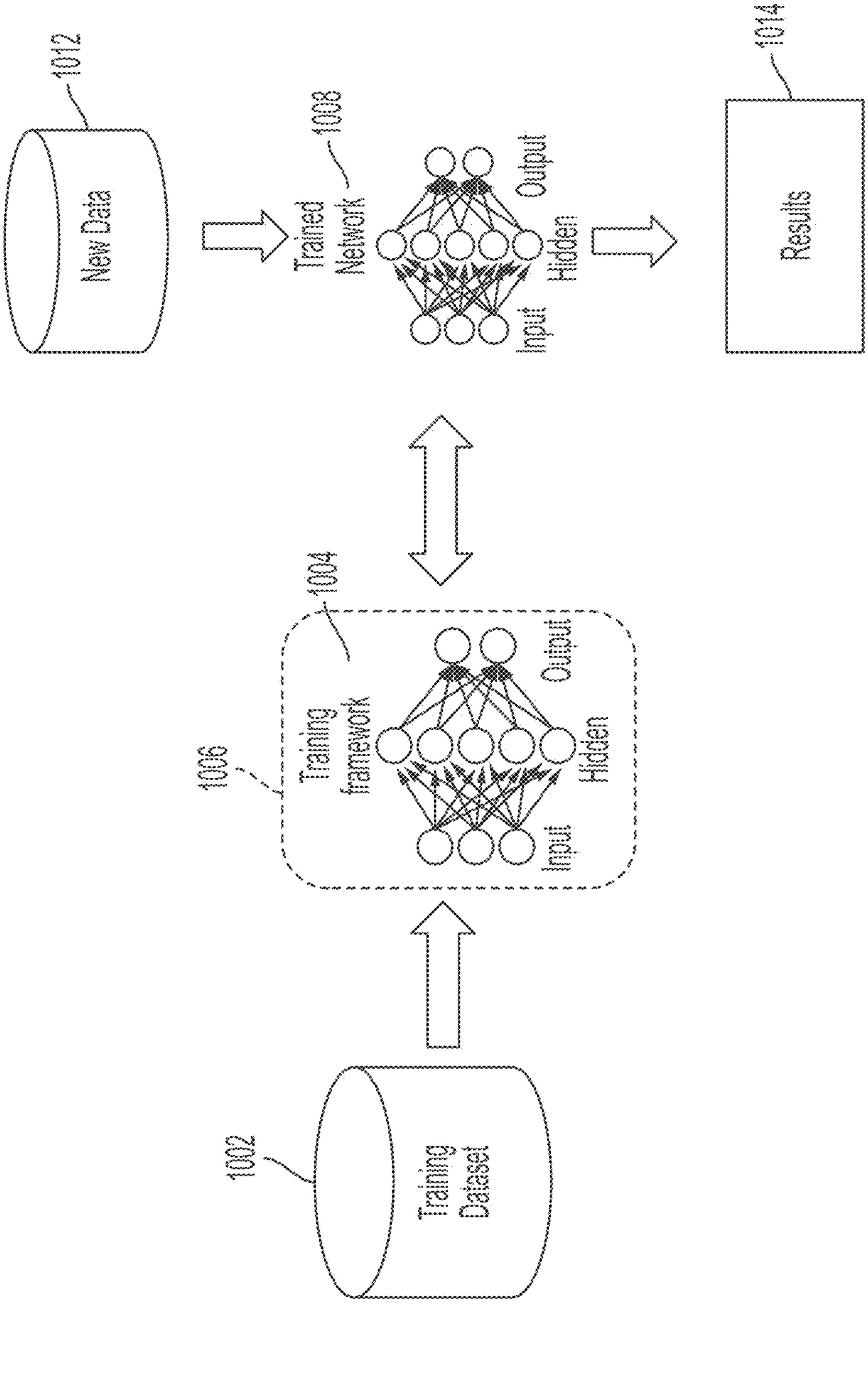
FIG. 10 illustrates training and deployment of a deep neural network in accordance with one or more embodiments.

FIG. 10 illustrates training and deployment of a deep neural network according to one embodiment of the disclosure. Once a given auditory network has been structured for a task the neural network may be trained using a training dataset 1002. Various training frameworks have been developed to enable hardware acceleration of the training process. For example, the machine learning framework 904 of FIG. 9 may be configured as a training framework 1004. The training framework 1004 can hook into an untrained neural network 1006 and enable the untrained neural net to be trained using the parallel processing resources described herein to generate a trained neural network 1008. To start the training process the initial weights (e.g., amplification gains corresponding to sound sources) may be chosen randomly or by pre-training using a deep belief network. The training cycle then be performed in either a supervised or unsupervised manner.

Supervised learning is a learning method in which training is performed as a mediated operation, such as when the training dataset 1002 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1004 can adjust to adjust the weights that control the untrained neural network 1006. The training framework 1004 can provide tools to monitor how well the untrained neural network 1006 is converging towards a model suitable to generating correct answers based on known input data. The training process occurs repeatedly as the weights of the network are adjusted to refine the output generated by the auditory neural network. The training process can continue until the neural network reaches a statistically desired accuracy associated with a trained neural network 1208. This determination may be made by the technology and auditory experts or may be implemented at machine level. The trained neural network 1008 can then be deployed to implement any number of machine learning operations.

Unsupervised learning is an exemplary learning method in which the network attempts to train itself using unlabeled data. Thus, for unsupervised learning the training dataset 1002 will include input data without any associated output data. The untrained neural network 1006 can learn groupings within the unlabeled input and can determine how individual inputs are related to the overall dataset. Unsupervised training can be used to generate a self-organizing map, which is a type of trained neural network 1007 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1002 includes a mix of labeled and unlabeled data of the same distribution. Incremental learning is a variant of supervised learning in which input data is continuously used to further train the model. Incremental learning enables the trained neural network 1008 to adapt to the new data 1012 without forgetting the knowledge instilled within the network during initial training. All of the preceding training may be implemented in conjunction with auditory experts, physicians and technicians.

Whether supervised or unsupervised, the training process for particularly deep neural networks may be too computationally intensive for a single compute node. Instead of using a single compute node, a distributed network of computational nodes can be used to accelerate the training process.

Example 1 is directed to an apparatus to enhance incoming audio signal, comprising: a controller to receive an incoming signal and provide a controller output signal; a neural network engine (NNE) circuitry in communication with the controller, the NNE circuitry activatable by the controller, the NNE circuitry configured to generate an NNE output signal from the controller output signal; and a digital signal processing (DSP) circuitry to receive one or more of controller output signal or the NNE circuitry output signal to thereby generate a processed signal; wherein the controller determines a processing path of the controller output signal through one of the DSP or the NNE circuitries as a function of one or more of predefined parameters, incoming signal characteristics and NNE circuitry feedback.

Example 2 is directed to the apparatus of Example 1, wherein the predefined parameters comprise user-defined and user-agnostic characteristics.

Example 3 is directed to the apparatus of Example 2, wherein the user-defined characteristics further comprises one or more of user signal to noise ratio (U-SNR) threshold and natural speaker identification.

Example 4 is directed to the apparatus of Example 2, wherein the user-agnostic characteristics further comprises one or more of available power level and system signal to noise (S-SNR) threshold.

Example 5 is directed to the apparatus of Example 1, wherein the incoming signal characteristics comprise detectable sound or detectable silence.

Example 6 is directed to the apparatus of Example 5, wherein the controller disengages at least one of the DSP or the NNE upon detecting silence wherein silence is defined by a noise level below a predefined threshold.

Example 7 is directed to the apparatus of Example 1, wherein the NNE circuitry feedback comprises a detected SNR value.

Example 8 is directed to the apparatus of Example 1, wherein the NNE circuitry feedback comprises an indication of voice detection at the NNE circuitry.

Example 9 is directed to the apparatus of Example 1, wherein the controller is configured to transmit an audio clip to the NNE circuitry to receive the NNE circuitry feedback.

Example 10 is directed to the apparatus of Example 9, wherein the audio clip defines a portion of the incoming signal and is transmitted intermittently from the controller.

Example 11 is directed to the apparatus of Example 9, wherein the audio clip has a predefined length and is transmitted during predefined intervals and at a frequency and wherein the frequency of transmission is determined as a function of the NNE circuitry feedback signal.

Example 12 is directed to the apparatus of Example 1, wherein the controller determines a processing path of the controller output signal in substantially real time.

Example 13 is directed to the apparatus of Example 1, wherein the controller, DSP and NNE are integrated on a System-on-Chip (SOC).

Example 14 is directed to the apparatus of Example 1, wherein the controller, DSP and NNE are integrated in a hearing aid configured to conform to be worn on a human ear.

Example 15 is directed to the apparatus of Example A, further comprising an Active Noise Cancellation (ANC) circuitry to process the controller output signal.

Example 16 is directed to a method to enhance quality of an incoming audio signal, the method comprising: receiving an incoming signal at a controller and providing a controller output signal; activating a neural network engine (NNE) to process the controller output signal for generating an NNE output signal and an NNE feedback signal; activating a digital signal processing (DSP) circuitry for receiving one or more of the controller output signal and the NNE circuitry output signal and for generating a processed signal; wherein the controller determines a processing path of the controller output signal through one of the DSP or the NNE circuitries as a function of one or more of predefined parameters, incoming signal characteristics and NNE circuitry feedback.

Example 17 is directed to the method of Example 16, wherein the predefined parameters comprise user-defined and user-agnostic characteristics.

Example 18 is directed to the method of Example 17, wherein the user-defined characteristics further comprises one or more of user signal to noise ratio (U-SNR) threshold and natural speaker identification.

Example 19 is directed to the method of Example 17, wherein the user-agnostic characteristics further comprises one or more of available power level and system signal to noise (S-SNR) threshold.

Example 20 is directed to the method of Example 16, wherein the incoming signal characteristics comprise detectable sound or detectable silence.

Example 21 is directed to the method of Example 20, further comprising disengaging the DSP and the NNE upon detecting silence at the controller.

Example 22 is directed to the method of Example 16, further comprising detecting an SNR value and the NNE and providing the detected SNR value as the NNE circuitry feedback signal.

Example 23 is directed to the method of Example 16, wherein the NNE feedback signal further comprises an indication of voice detection at the NNE.

Example 24 is directed to the method of Example 16, further comprising transmitting an audio clip from the controller to the NNE prior to receiving the NNE feedback signal.

Example 25 is directed to the method of Example 24, wherein the audio clip defines a portion of the incoming signal and is transmitted intermittently.

Example 26 is directed to the method of Example 24, wherein the audio clip has a predefined length and is transmitted during predefined intervals and at a frequency and wherein the frequency of transmission is determined as a function of the NNE circuitry feedback signal.

Example 27 is directed to the method of Example 16, further comprising determining a processing path at the controller in real time.

Example 28 is directed to the method of Example 16, further comprising integrating the controller, DSP and NNE on a System-on-Chip (SOC).

Example 29 is directed to the method of Example 16, further comprising integrating the controller, DSP and NNE in a hearing aid configured to fit in a human ear.

Example 30 is directed to the method of Example 16, further engaging an Active Noise Cancellation (ANC) circuitry when processing the controller output signal through the NNE circuitry.

Example 31 is directed to at least one non-transitory machine-readable medium comprising instructions that, when executed by computing hardware, including a processor circuitry coupled to a memory circuitry, cause the computing hardware to: receive an incoming signal at a controller and providing a controller output signal; activate a neural network engine (NNE) to process the controller output signal for generating an NNE output signal and an NNE feedback signal; activate a digital signal processing (DSP) circuitry for receiving one or more of the controller output signal and the NNE circuitry output signal and for generating a processed signal; wherein the controller determines a processing path of the controller output signal through one of the DSP or the NNE circuitries as a function of one or more of predefined parameters, incoming signal characteristics and NNE circuitry feedback.

Example 32 is directed to the medium of Example 31, wherein the predefined parameters comprise user-defined and user-agnostic characteristics.

Example 33 is directed to the medium of Example 32, wherein the user-defined characteristics further comprises one or more of user signal to noise ratio (U-SNR) threshold and natural speaker identification.

Example 34 is directed to the medium of Example 32, wherein the user-agnostic characteristics further comprises one or more of available power level and system signal to noise (S-SNR) threshold.

Example 35 is directed to the medium of Example 31, wherein the incoming signal characteristics comprise detectable sound or detectable silence.

Example 36 is directed to the medium of Example 35, wherein the instructions further cause the computing hardware to disengage the DSP and the NNE upon detecting silence at the controller.

Example 37 is directed to the medium of Example 31, wherein the instructions further cause the computing hardware to detect an SNR value and the NNE and providing the detected SNR value as the NNE circuitry feedback signal.

Example 38 is directed to the medium of Example 31, wherein the NNE feedback signal further comprises an indication of voice detection at the NNE.

Example 39 is directed to the medium of Example 31, wherein the instructions further cause the computing hardware to transmit an audio clip from the controller to the NNE prior to receiving the NNE feedback signal.

Example 40 is directed to the medium of Example 39, wherein the audio clip defines a portion of the incoming signal and is transmitted intermittently.

Example 41 is directed to the medium of Example 39, wherein the audio clip has a predefined length and is transmitted during predefined intervals and at a frequency and wherein the frequency of transmission is determined as a function of the NNE circuitry feedback signal.

Example 42 is directed to the medium of Example 31, wherein the instructions further cause the computing hardware to determine a processing path at the controller in real time.

Example 43 is directed to the medium of Example 31, wherein the controller, DSP and NNE are integrated in a hearing aid configured to fit in a human ear.

Example 44 is directed to a hearing system to enhance incoming audio signal, comprising: a frontend receiver to receive one or more incoming audio signals, at least one of the incoming audio signals having a plurality of signal components wherein each signal component corresponds to a respective signal source; a controller in communication with the frontend receiver, the controller to receive an input signal from the frontend receiver and provide a controller output signal, the controller to selectively provide the output signal to at least one of a first or a second signal processing paths; a neural network engine (NNE) circuitry in communication with the controller to define a part of the first signal processing path, the NNE circuitry activatable by the controller, the NNE circuitry configured to generate an NNE output signal from the controller output signal; and a digital signal processing (DSP) circuitry to form a part of the first and the second signal processing paths, the DSP to receive one or more of controller output signal or the NNE circuitry output signal to thereby generate a processed signal; wherein the frontend receiver, the controller, the NNE circuitry and the DSP circuitry are formed on an integrated circuit (IC).

Example 45 is directed to the hearing system of Example 44, further comprising a backend receiver to receive an output signal from the DSP to form an audible signal.

Example 46 is directed to the hearing system of Example 45, wherein the hearing system defines one of a hearing aid, a headphone or faceworn glasses and wherein the audible signal is formed in less than 32 milliseconds after receiving the incoming signal.

Example 47 is directed to the hearing system of Example 44, wherein the IC comprises a System-on-Chip (SOC).

Example 48 is directed to the hearing system of Example 47, further comprising a housing to receive the SOC and a power source.

Example 49 is directed to the hearing system of Example 44, wherein the controller determines the processing path of the controller output signal as a function of an NNE circuitry feedback.

Example 50 is directed to the hearing system of Example 44, wherein the controller determines a processing path of the controller output signal as a function of one or more of predefined parameters, incoming signal characteristics and NNE circuitry feedback.

Example 51 is directed to the hearing system of Example 44, further comprising a wireless communication system.

Example 52 is directed to the hearing system of Example 44, wherein the NNE circuitry adjusts the relative volumes of the incoming signal components and wherein the DSP circuitry applies a frequency and time-varying gain to the received signal.

Example 53 is directed to the hearing system of Example 52, wherein the incoming signal components are further comprised of at least speech and noise and wherein the speech volume is increased relative to noise volume.

Example 54 is directed to the hearing system of Example 44, wherein the frontend receiver processes an incoming signal to provide an input signal to the controller, the incoming signal including one or more of speech and noise components.

Example 55 is directed to the hearing system of Example 52, wherein the NNE circuitry selectively applies a ratio mask to the incoming signal of the frontend receiver to obtain a plurality of components wherein each of the plurality of components corresponds to a class of sounds.

Example 56 is directed to the hearing system of Example 44, wherein the NNE circuitry is configured to selectively apply a complex ratio mask to the controller output signal to obtain a plurality of signal components wherein each of the plurality of signal components corresponds to a class of sounds or an individual speaker, the NNE circuitry further configured to combine the plurality of components into a output signal wherein the volume of each of the components is adjusted relative to at least one other component according to a predefined user-controlled signal to noise ratio.

Example 57 is directed to the hearing system of Example 56, wherein the signal components further comprise speech and noise and wherein the output signal comprises an increased speech volume relative to noise volume.

Example 58 is directed to the hearing system of Example 56, wherein the signal components further comprise user's speech and a plurality of other sound sources and wherein the output signal comprises decreased user's speech relative to other sound sources.

Example 59 is directed to the hearing system of Example 56, wherein the NNE circuitry is further configured to set the respective volumes of different sound sources as a function of user-controlled parameters.

Example 60 is directed to the hearing system of Example 44, wherein the second signal processing path excludes signal processing through the NNE.

Example 61 is directed to the hearing system of Example 44, wherein the NNE circuitry is further configured to implement one or more of the DSP functions.

Example 62 is directed to a method to enhance incoming audio signal quality, the method comprising: receiving at a frontend receiver one or more incoming audio signals, at least one of the incoming audio signals having a plurality of signal components wherein each signal component corresponds to a respective signal source; at a controller, receiving an input signal from the frontend receiver and providing a controller output signal, the controller selectively providing the output signal to at least one of a first or a second signal processing paths; generating an NNE output signal from the controller output signal at a neural network engine (NNE) circuitry activatable by the controller, the NNE defining the at least a portion of the first signal processing path; and generating a processed signal from the controller output signal or the NNE circuitry output signal at a digital signal processing (DSP) circuitry, the DSP defining at least a portion of the first and the second signal processing paths; wherein the frontend receiver, the controller, the NNE circuitry and the DSP circuitry are formed on an integrated circuit (IC).

Example 63 is directed to the method of Example 62, further comprising forming an output signal from the processed signal at a backend receiver.

Example 64 is directed to the method of Example 63, further comprising forming the output signal in less than 32 milliseconds after receiving the incoming signal.

Example 65 is directed to the method of Example 63, wherein the hearing system defines one of a hearing aid, a headphone or faceworn glasses.

Example 66 is directed to the method of Example 62, wherein the IC comprises a System-on-Chip (SOC).

Example 67 is directed to the method of Example 66, further comprising a housing to receive the SOC and a power source.

Example 68 is directed to the method of Example 62, further comprising determining the processing path for the controller output signal as a function of an NNE circuitry feedback.

Example 69 is directed to the method of Example 62, further comprising determining a processing path of the controller output signal as a function of one or more of predefined parameters, incoming signal characteristics and NNE circuitry feedback.

Example 70 is directed to the method of Example 62, further comprising processing the incoming signal having one or more of speech and noise components at the frontend receiver to provide an input signal to the controller.

Example 71 is directed to the method of Example 70, wherein the NNE circuitry selectively applies a ratio mask to the incoming signal of the frontend receiver to obtain a plurality of components wherein each of the plurality of components corresponds to a class of sounds.

Example 72 is directed to the method system of Example 62, further comprising applying a complex ratio mask to the controller output signal at the NNE circuitry to obtain a plurality of signal components wherein each of the plurality of signal components corresponds to a class of sounds or an individual speaker and combining the plurality of components into a output signal at the NNE circuitry and wherein the volume of each component is adjusted relative to at least one other component according to a predefined user-controlled signal to noise ratio.

Example 73 is directed to the method of Example 72, wherein the signal components further comprise speech and noise and wherein the output signal comprises an increased speech volume relative to noise volume.

Example 74 is directed to the method of Example 72, wherein the signal components further comprise user speech and a plurality of other sound sources and wherein the output signal comprises decreased user's speech relative to other sound sources.

Example 75 is directed to the method of Example 72, wherein the NNE circuitry is further configured to set the respective volumes of different sound sources as a function of user-controlled parameters.

Example 76 is directed to the method of Example 62, wherein signal processing through the first signal processing path excludes signal processing through the NNE.

Example 77 is directed to at least one non-transitory machine-readable medium comprising instructions that, when executed by computing hardware, including a processor circuitry coupled to a memory circuitry, cause the computing hardware to: receive at a frontend receiver one or more incoming audio signals, at least one of the incoming audio signals having a plurality of signal components wherein each signal component corresponds to a respective signal source; receive an input signal from the frontend receiver and provide a controller output signal, the controller to selectively provide the output signal to at least one of a first or a second signal processing paths; generate an NNE output signal from the controller output signal at a neural network engine (NNE) circuitry activatable by the controller, the NNE to define the at least a portion of the first signal processing path; and generate a processed signal from the controller output signal or the NNE circuitry output signal at a digital signal processing (DSP) circuitry, the DSP to define at least a portion of the first and the second signal processing paths; wherein the frontend receiver, the controller, the NNE circuitry and the DSP circuitry are formed on an integrated circuit (IC).

Example 78 is directed to the medium of Example 77, wherein the instructions further cause the computing hardware to form an output signal from the processed signal at a backend receiver.

Example 79 is directed to the medium of Example 78, wherein the instructions further cause the computing hardware to form the output signal in less than 32 milliseconds after receiving the incoming signal.

Example 80 is directed to the medium of Example 78, wherein the hearing system defines one of a hearing aid, a headphone or facework glasses.

Example 81 is directed to the medium of Example 77, wherein the IC comprises a System-on-Chip (SOC).

Example 82 is directed to the medium of Example 77, wherein the instructions further cause the computing hardware to determine the processing path for the controller output signal as a function of an NNE circuitry feedback.

Example 83 is directed to the medium of Example 77, wherein the instructions further cause the computing hardware to determine a processing path of the controller output signal as a function of one or more of predefined parameters, incoming signal characteristics and NNE circuitry feedback.

Example 84 is directed to the medium of Example 77, wherein the instructions further cause the computing hardware to process the incoming signal having one or more of speech and noise components at the frontend receiver to provide an input signal to the controller.

Example 85 is directed to the medium of Example 84, wherein the NNE circuitry is configured to selectively apply a ratio mask to the incoming signal of the frontend receiver to obtain a plurality of components wherein each of the plurality of components corresponds to a class of sounds.

Example 86 is directed to the medium of Example 77, wherein the instructions further cause the computing hardware to apply a complex ratio mask to the controller output signal at the NNE circuitry to obtain a plurality of signal components wherein each of the plurality of signal components corresponds to a class of sounds or an individual speaker and combining the plurality of components into a output signal at the NNE circuitry and wherein the volume of each component is adjusted relative to at least one other component according to a predefined user-controlled signal to noise ratio.

Example 87 is directed to the medium of Example 86, wherein the signal components further comprise speech and noise and wherein the output signal comprises an increased speech volume relative to noise volume.

Example 88 is directed to the medium of Example 84, wherein the signal components further comprise user speech and a plurality of other sound sources and wherein the output signal comprises decreased user's speech relative to other sound sources.

Example 89 is directed to the medium of Example 84, wherein the instructions further cause the computing hardware to set the respective volumes of different sound sources as a function of user-controlled parameters.

Example 90 is directed to the medium of Example 77, wherein signal processing through the first signal processing path excludes signal processing through the NNE.

Example 91 is directed to an ear-worn hearing system to enhance an incoming audio signal, comprising: a neural network engine (NNE) circuitry configured to enhance sequentially-received signal samples and then output a continuous audible signal based on the enhanced signal samples.

Example 92 is directed to the hearing system of 91, wherein the audible signal is generated in about 32 milliseconds or less of receipt of the received signal.

Example 93 is directed to the hearing system of 91, wherein the audible signal is generated in about 10 milliseconds or less of receipt of the received signal.

Example 94 is directed to the hearing system of 91, wherein the audible signal is generated at about 10-20 ms, 12-8 ms, 10-6 ms or 8-3 milliseconds of receipt of the incoming audio signal.

Example 95 is directed to the hearing system of 92, wherein the neural network performs at least 1 billion operations per second.

Example 96 is directed to the hearing system of 95, wherein the NNE circuitry is configured to process an audio signal with an associated power consumption of about 2 milliwatts or less.

Example 97 is directed to the hearing system of 96, wherein the NNE circuitry is formed on a System-on-Chip (SOC) and further comprises a plurality of non-transitory executable logic to perform signal processing operations with multiple precision levels.

Example 98 is directed to the hearing system of 91, wherein the neural network enhances the audio signal by estimating a complex ratio mask for each signal sample to obtain the desirable signal component.

Example 99 is directed to the hearing system of 98, wherein the desirable signal component is speech.

Example 100 is directed to the hearing system of 99, wherein the desirable signal component is one or more recognized speakers.

Example 101 is directed to the hearing system of Example 98, wherein the enhanced audio signal exhibits decreased background noise and wherein the background noise is user configurable.

Example 102 is directed to the hearing system of Example 101, further comprising a physical control switch accessible on the hearing system to adjust background noise level.

Example 103 is directed to the hearing system of Example 101, further comprising a logical control switch accessible through an auxiliary device to adjust background noise level.

Example 104 is directed to an ear-worn hearing system to enhance an incoming audio signal, comprising: a neural network engine (NNE) circuitry configured to enhance the audibility of a received signal and provide an enhanced continuous output signal; and a control dial to adjust background noise by manipulating at least one NNE circuitry configuration to correspond to a user input.

Example 105 is directed to the hearing system of Example 104, wherein the control dial comprises an adjustable physical dial.

Example 106 is directed to the hearing system of Example 104, wherein the control dial affects the signal-to-noise ratio (SNR) of the continuous output signal.

Example 107 is directed to the hearing system of Example 104, wherein the control dial exclusively affects the noise component of the incoming audio.

Example 108 is directed to an apparatus to enhance audibility of an audio signal, the apparatus comprising: a neural network engine (NNE) circuitry to receive one or more input audio signals and output one or more intermediate signals, each intermediate signal further comprising an audio signal corresponding to one or more sound sources; a sound mixer circuitry configured to receive the one or more intermediate signals, assign a gain to each intermediate signals and recombine the one or more intermediate signals to form a new output signal; wherein the gains assigned to the one or more intermediate signals are set to achieve a target signal-to-noise ratio (SNR) and wherein the SNR is determined as a function of at least one user-specific criteria and at least one user-agnostic criteria.

Example 109 is directed to the apparatus of Example 108, wherein the user specific criteria comprises volume targets for certain desired Signal sound classes and a Noise sound class or a desired ratio of volumes between desired sound classes and SNR.

Example 110 is directed to the apparatus of Example 109, wherein the desired sound class volumes are user controlled.

Example 111 is directed to the apparatus of Example 108, wherein the number and composition of the intermediate signals as output by the neural network are configurable according to user-specific selection criteria.

Example 112 is directed to the apparatus of Example 109, wherein the user specific criteria further comprises the desired amplification of one or more natural speakers.

Example 113 is directed to the apparatus of Example 109, wherein the user agnostic criteria further comprise the estimated SNR of recently received and processed input audio signal.

Example 114 is directed to the apparatus of Example 109, wherein the user agnostic criteria further comprise the estimated error of the neural network.

Example 115 is directed to the apparatus of Example 114, wherein the step of the sound mixer circuitry recombines the one or more intermediate signals to form a new output signal based on predicted error of the network.

Example 116 is directed to the apparatus of Example 108, wherein the target SNR is determined as the lower of the user's desired SNR or the SNR based on the estimated error of the neural network.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An ear-worn device, comprising:

front-end circuitry configured to generate audio signals;

communication circuitry configured to receive at least one user input from an external device in wireless communication with the ear-worn device, wherein the at least one user input comprises a user preference for speech amplification or a user preference for noise reduction;

digital signal processing (DSP) circuitry configured to:

process the audio signals at first time intervals; and perform audio enhancement on the audio signals based on the at least one user input; and neural network engine (NNE) circuitry configured to process the audio signals at second time intervals that are less frequent than the first time intervals; and provide supportive computation for the audio enhancement performed by the DSP circuitry.

2. A system comprising the ear-worn device of claim 1 and the external device, wherein the external device is configured to display a graphical user interface (GUI) comprising a first GUI element corresponding to the user preference for speech amplification and a second GUI element corresponding to the user preference for noise reduction.

3. The ear-worn device of claim 1, wherein the supportive computation comprises detecting speech.

4. The ear-worn device of claim 1, wherein the front-end circuitry and the DSP circuitry are in a signal path and the NNE circuitry is not in the signal path.

5. The ear-worn device of claim 1, wherein the ear-worn device is configured to characterize an acoustic environment when engaging the NNE circuitry.

6. The ear-worn device of claim 1, further comprising a controller configured to engage the NNE circuitry based on detecting a tap on the ear-worn device.

7. The ear-worn device of claim 1, further comprising a controller configured to automatically engage the NNE circuitry based on user-agnostic criteria.

8. The ear-worn device of claim 1, wherein the NNE circuitry is configured to perform at least 1 billion operations per second.

9. The ear-worn device of claim 1, wherein the NNE circuitry is configured to achieve at least 2 billion operations per milliwatt.

10. The ear-worn device of claim 3, wherein the NNE circuitry is configured to detect presence of the speech with an associated power consumption of about 2 milliwatts or less.

11. The ear-worn device of claim 1, wherein the NNE circuitry is implemented on a single chip in the ear-worn device.

* * * * *